United States Patent
Haitani et al.

(10) Patent No.: US 9,697,573 B1
(45) Date of Patent: *Jul. 4, 2017

(54) COLOR-RELATED SOCIAL NETWORKING RECOMMENDATIONS USING AFFILIATED COLORS

(71) Applicant: Amazon Technologies, Inc., Reno, NV (US)

(72) Inventors: Robert Yuji Haitani, Seattle, WA (US); Jenny Ann Blackburn, Seattle, WA (US); Charles Shearer Dorner, Seattle, WA (US); Eva Manolis, Bellevue, WA (US); Timothy Andrew Ong, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

This patent is subject to a terminal disclaimer.

(21) Appl. No.: 14/316,445

(22) Filed: Jun. 26, 2014

(51) Int. Cl.
*G06F 15/16* (2006.01)
*G06Q 50/00* (2012.01)
*G06Q 30/06* (2012.01)

(52) U.S. Cl.
CPC ......... *G06Q 50/01* (2013.01); *G06Q 30/0601* (2013.01)

(58) Field of Classification Search
CPC ... G06Q 10/10; H04L 29/08072; H04L 29/06; H04L 29/06034
USPC ........................................................ 709/205
See application file for complete search history.

(56) References Cited

U.S. PATENT DOCUMENTS

| | | |
|---|---|---|
| 5,508,718 A | 4/1996 | Haikin |
| 5,822,503 A | 10/1998 | Gass, Jr. et al. |
| 6,081,276 A | 6/2000 | Delp |
| 6,124,945 A | 9/2000 | Ishihara et al. |
| 6,385,336 B1 | 5/2002 | Jin |
| 6,577,759 B1 | 6/2003 | Caron et al. |
| 7,136,074 B2 | 11/2006 | Hussie |

(Continued)

FOREIGN PATENT DOCUMENTS

| | | |
|---|---|---|
| JP | 2012-221317 A | 11/2012 |
| WO | WO 2014/070914 A1 | 5/2014 |

(Continued)

OTHER PUBLICATIONS

"Exalead CloudView Semantics Whitepaper," Doc. No. EN.140.001.0-V1.2; Oct. 2010, pp. 1-30. Retrieved from http:www.3ds.com/fileadmin/PRODUCTS/EXALEAD/Documents/whitepapers/Exalead-CloudView-Semantics-EN.pdf on Aug. 24, 2015.

(Continued)

*Primary Examiner* — Alan S Chou
(74) *Attorney, Agent, or Firm* — Knobbe Martens Olson & Bear LLP

(57) ABSTRACT

Systems and methods are provided for generating social networking recommendations. A color preference of a first user may be determined from a color palette of a first image associated with the user and/or a color palette of an item associated with the user. Other users may be identified that have a similar color preference as the first user based at least in part on the determined color preference of the first user. Interactions between the first user and one or more other users having similar color preferences with respect to the first user may be facilitated. A social networking recommendation may be generated with respect to the one or more other users having similar color preferences with respect to the first user.

21 Claims, 8 Drawing Sheets

(56) References Cited

U.S. PATENT DOCUMENTS

| | | |
|---|---|---|
| 7,444,658 B1 | 10/2008 | Matz et al. |
| 8,553,045 B2 | 10/2013 | Skaff et al. |
| 8,576,241 B1 | 11/2013 | Kanter et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,401,032 B1 | 7/2016 | Dorner et al. |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0069442 A1 | 3/2008 | Itoh |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0157595 A1 | 6/2009 | Gubitz |
| 2009/0227375 A1 | 9/2009 | Weisman et al. |
| 2009/0259567 A1 | 10/2009 | Watts |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2011/0135195 A1 | 6/2011 | Marchesotti et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1 | 2/2012 | Youngman et al. |
| 2012/0075329 A1 | 3/2012 | Skaff et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2013/0033603 A1 | 2/2013 | Suzuki et al. |
| 2013/0050238 A1 | 2/2013 | Bergou et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2014/0037200 A1 | 2/2014 | Phillips et al. |
| 2014/0044349 A1 | 2/2014 | Wang et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0189476 A1 | 7/2014 | Berthelot et al. |
| 2014/0300775 A1 | 10/2014 | Fan et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379071 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |

FOREIGN PATENT DOCUMENTS

| | | |
|---|---|---|
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Dorner, C.S. Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 mailed on Oct. 1, 2015.

International Search Report and Written Opinion in PCT/US2015/037456 mailed on Sep. 9, 2015.

International Search Report and Written Opinion in PCT/US2015/037494 mailed on Sep. 14, 2015.

International Search Report and Written Opinion in PCT/US2015/037465 mailed on Oct. 27, 2015.

International Search Report and Written Opinion in PCT/US2015/037481 mailed on Sep. 14, 2015.

Das et al., "Indexing flowers by color names using domain knowledge-driven segmentation," Proc. The Fourth IEEE Workshop on Applications of Computer Vision; pp. 94-99; 1998.

(56) References Cited

OTHER PUBLICATIONS

Wang et al., "Contextual Dominant Color Name Extraction for Web Image Search," 2012 IEEE International Conference on Multimedia and Expo Workshops (ICMEW), pp. 319-324.

"Color Blind Assistant." iPhone Apps Versions 2.61 and 2.62; Release date Oct. 14-15, 2009; pp. 1-7.

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page. <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14. 2005, pp. 706-709.

Nickerson, D., et al., Central Notations for ISCC-NBS Color Names, Journal of the Optical Society of America, vol. 31; pp. 587-591; Sep. 1941.

U.S. Appl. No. 14/316,483, entitled Image-Based Color Palette Generation, filed Jun. 26, 2014.

Bell, E. Color Detection: Technology on Heels with Lyst Engineering, dated Feb. 22, 2014, retrieved Apr. 7, 2014, <http://developers.lyst.com/data/images/2014/02/22/color-detection/>.

Luo et al., "Novel color palettization scheme for preserving important colors," Proc. SPIE. 5008. Color Imaging VIII: Processing, Hardcopy, and Applications; Jan. 20, 2003.

Montagne et al., "Adaptive color quantization using the baker's transformation," J. Electronic Imaging 15(2); Apr. 2006.

Periasamy et al., "A Common Palette Creation Algorithm for Multiple Images with Transparency Information," IEEE 2009 Int'l Conf. on Advances in Computing, Control, and Telecommunication Technologies.

Yu et al., "Contextual algorithm for color quantization," J. Electronic Imaging 12(3); Jul. 2003.

Das et al, Indexing Flower Patent Images Using Domain Knowledge, IEEE Intelligent Systems, vol. 14, No. 5; 1999, pp. 24-33.

COLOR-RELATED SOCIAL NETWORKING RECOMMENDATIONS USING AFFILIATED COLORS

BACKGROUND

In many computing-centric commerce models, users are able to efficiently view and purchase a wide variety of items over computer networks. In many scenarios, a particular network resource, such as a commerce network site, can present items (e.g., goods and/or services) associated with different colors. The items may be depicted in photographs or other images presented via the network site. Users of such commerce network sites and other network sites may have certain color preferences.

BRIEF DESCRIPTION OF THE DRAWINGS

The foregoing aspects and many of the attendant advantages will become more readily appreciated as the same become better understood by reference to the following detailed description, when taken in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
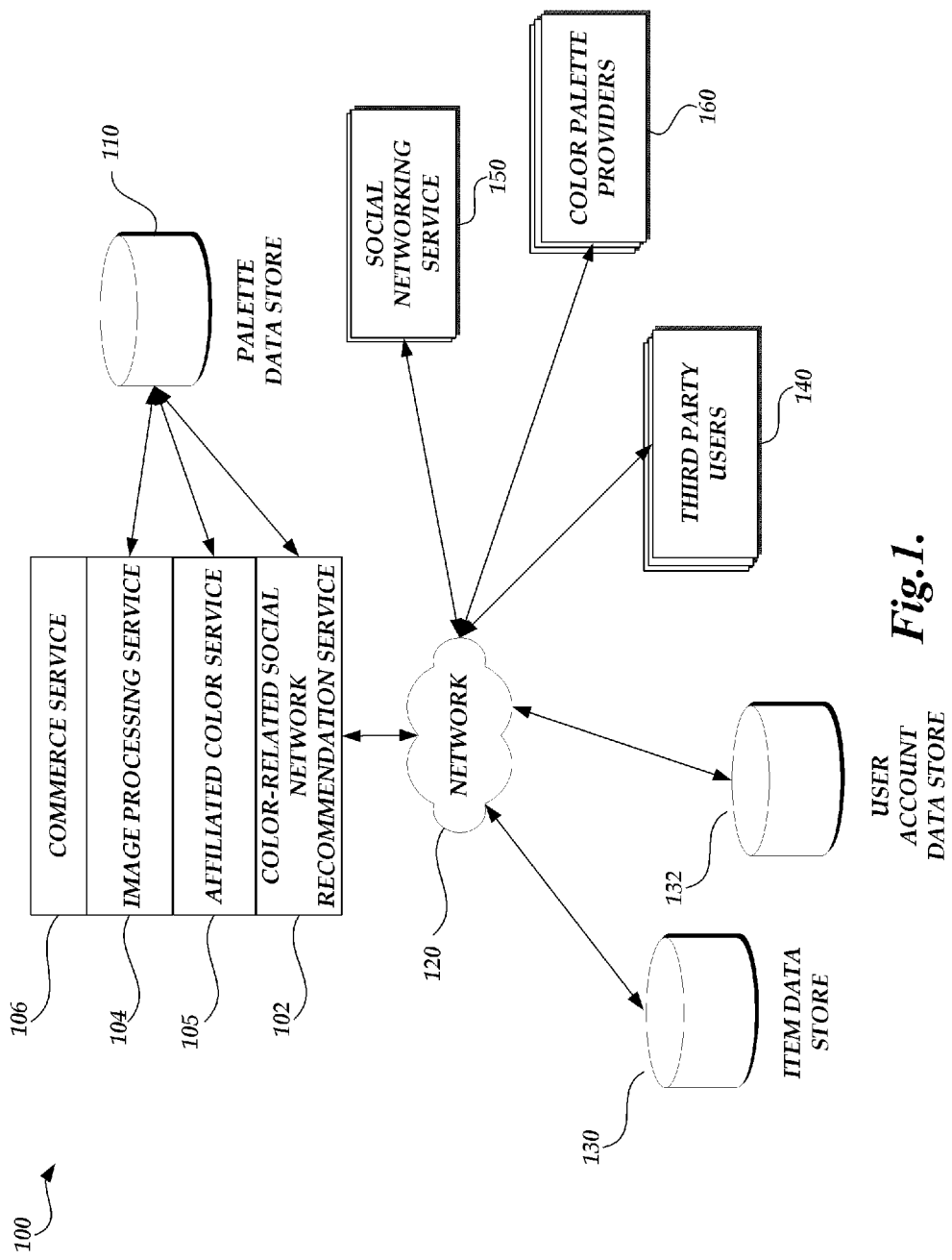
FIG. 1 is a block diagram illustrating one embodiment of an operating environment including an image processing service for color palette generation based on color images, an affiliated color services for identifying affiliated colors, and a color recommendation service.

Generally described, the present disclosure corresponds to methods and systems for providing color-related social network recommendations. Often, users have particular color preferences with respect to clothing, makeup, furniture, jewelry, and other items. Such users may wish to interact with other users having similar color preferences. For example, a given user may wish to learn what items other users with a similar color preference are purchasing or what items in which other users with similar color preferences are interested, as the given user may be interested in purchasing or otherwise utilizing such an item. Further, a given user may want to ask the opinion of another user having similar tastes regarding a given item or set of items, such as color palettes, clothing, furniture, appliances, and other items. For example, a user trying to decide what to wear or what to purchase may want to seek the opinion of another user having similar color tastes. Still further, a user may simply wish to socialize via an electronic social network or otherwise with other users or communities of users having similar tastes in color. Aspects of the present disclosure relate to determining color preferences of a user and to determining color preferences of a user by determining palettes of one or more images provided by or associated with the user. Aspects of the present disclosure relate to identifying users that have similar color preferences. Yet other aspects of the present disclosure relate to enabling users that have similar color preferences to interact and share color-related information, such as item purchases, color palettes, and opinions.

In accordance with an illustrative embodiment, a color-related social network recommendation service identifies color preferences of a user and uses such identified color preferences to identify similar users. The color-related social network recommendation service may identify similar users by matching or otherwise identifying affiliated color preferences amongst users. One or more techniques may be used singly or in combination.

A given user may be associated with one or more colors or color palettes. The association may be based on, in whole or in part: an affirmative selection of a palette by the user, palettes associated with items purchased by the user (e.g., as determined from the user's purchase history); palettes associated with items browsed by the user (e.g., as determined from the user's browse history); palettes of items in the user's home (e.g., the user's wardrobe); searches performed by the user (e.g., search for colors or keyword searches that may be related to palettes); color palettes of items the user has liked on social networking sites, user images, etc. Metadata identifying the palettes associated with the user may be stored in association with the user's account record. Users that are associated with similar palettes (e.g., matching palettes, palettes within a specified range of similarity, and/or affiliated palettes, such as those having at least one matching color or at least one color within a specified range of a matching color plus one or more additional colors that are otherwise affiliated with the matching color or the specified color range) may be determined. Those users associated with similar color palettes may be identified to one another as a recommended social networking partner or group member. For example, an implicit group of users may be defined based at least in part on the similarity of their associated color palettes. The implicit group may be identified on a social networking page. By way of illustration, a given user may be identified by a user name (which may be an alias name), a representative image (which may be a photograph or graphic provided or selected by the user), the user's preferred color palettes, the user's item preferences, brand preferences, etc.

In particular, a user's color preferences may be explicitly provided by the user via a form or otherwise. For example, a form provided to the user may textually and/or via images describe or depict color palettes (including one or more colors). The user may designate one or more palettes as preferred palettes and may designate one or more palettes as disfavored/disliked palettes. Optionally, a user may indicate the strength of a preference via a score or a textual rating. For example, a user may indicate that on a scale of 1-10, with 1 being the least preferred and 10 being the most preferred, the user's preference with respect to one or more color palettes. By way of further example, a user may select or enter a preference description, such as "strongly like," "somewhat like," "indifferent," "somewhat dislike," or "strongly dislike." Of course other preference indicators may be used. The user's explicit color preference indication(s) may be stored in a user account record.

In accordance with an illustrative embodiment, an image processing service accesses one or more color images submitted by the user and/or obtained from a social networking page associated with the user. The images may depict one or more items or designs, where the user indicates or it is otherwise determined that the user prefers one or more colors of the item or design. For example, the color images may be of clothing items in the user's wardrobe, of the user's furniture, and/or of items that the user likes. The image processing service generates one or more color palettes from the one or more color images (e.g., based on palette generation criteria). Optionally, the image processing service determines color names for the generated palettes. Color palette information corresponding to the generated color palettes may be stored in association with the user's account. For example, the color palette information may comprise the color palette itself and/or the color name(s) associated with the color palette, and/or an indication that the color palette is a preferred color palette of the user. Several different color palettes may be generated based on the user's images. A generated preference indication, such as a preference score and/or ranking, may be generated based at least in part on the frequency each of the generated palettes appear in the user's images. The generated preference indication(s) may be stored in association with the user's account and in association with the color palette information.

In accordance with an illustrative embodiment, color palette information may be accessed from a user's purchase or browse history. For example, when a user purchases or otherwise browses an item, a record of the purchase or selection of the item may be stored in association with the user's account. The purchase record may include metadata associated with the item, such as a name of the item, a color name, a color image, an item type (e.g., blouse, skirt, shoes), and an item category (e.g., clothing, furniture, appliances, etc.). The user's color preference, including the user's color preference for different item types and categories, may be determined from the color palette information included in the metadata associated with the items purchased by the user. A color preference indication, such as a preference score and/or ranking, may be generated based at least in part on the frequency each of the color palettes appear in the user's purchases. The generated color preference indication(s) may be stored in association with the user's account.

User color preference information may also be determined from a social networking service utilized by the user. In accordance with another illustrative embodiment, a user's existing social network may be determined from information the user has made accessible to a color-related social networking service. For example, the user may have uploaded or otherwise provided the color-related social networking service with access to the user's contact records, which may include names, email addresses, and social network site links. For example, the user may have uploaded or otherwise provided the color-related social networking service with access to at least portions of the user's electronic communications (e.g., who the communications were directed to or received from), such as emails, SMS messages, video chats, or the like. The user's social network may also be obtained from a social networking site. For example, the color-related social networking service may access a user's social graph that depicts personal relations of the user (e.g., indicates other users with whom the user has an established social network relationship).

By way of further example, given the appropriate permissions, the color-related social networking service may access user objects made available via the social networking site (e.g., user images and associated metadata, such as descriptions of items in the images, optionally including color palette information, and user ratings or feedback regarding such objects). The user's color preferences for different item types and categories may be determined from the social networking data, such as color name data, item descriptions, images, etc. The frequency in which data corresponding to a given color palette appears in the user's social networking data may also be used to determine the user's color preference(s). By way of example, the images may be processed to determine respective color palettes and color names for the color palettes as similarly described elsewhere herein. A color preference indication, such as a preference score and/or ranking, may be generated based at least in part on the frequency of a given color palette, color name, or other color identifier occurs with respect to the social networking data. The generated color preference indication(s) may be stored in association with the user's account. Thus, a user's color preferences may be determined based on images and from the user's social network.

As noted above, a user's color preference information may be determined from a variety of sources. The color preference information from the variety of sources may be combined to form a unified color preference determination and ranking. In generating a unified color preference determination and ranking, color preference information from certain sources may be weighted differently than color preference information from other sources. For example, the user's explicit color preference indications may be assigned the highest weighting, the color preference indications determined from the user's purchase or browse history may be assigned the next highest weighting, and the color preference indications determined from the user's social networking information may be assigned the third highest weighting, and so on. The foregoing is just one example weighting scheme and other weighting schemes may be used. For example, the color preference indications determined from the user's social networking information may be assigned the highest weighting, the user's explicit color preference indications may be assigned the next highest weighting, and the color preference indications determined from the user's purchase or browse history may be assigned the third highest weighting, and so on.

Based at least in part on the color preference indication(s) (e.g., the unified color preference determination and/or ranking) for a given user, in accordance with an illustrative embodiment, other users having the same or similar color preferences may be identified. A user's color preference indication may optionally be used as a user fingerprint to identify the user.

By way of illustration, the social networking service may identify other users that have the same most preferred color palette, and/or may identify other users that have the same ranking of multiple preferred color palettes, for at least a portion of the user's color palette rankings (e.g., the top three ranked color palettes). By way of further example, the social networking service may identify users that have the same most preferred palette and the same next two most preferred palettes, even though the ranking of the next two most preferred palettes may differ. By way of illustration, in this example if User 1 and User 2 have the same most preferred palette (palette A), and User 1's second most preferred palette is palette B and third most preferred palette is palette C, while User 2's second most preferred palette is palette C and third most preferred palette is palette B, then in this illustration User 1 and User 2 will be identified as "matching users" with similar enough tastes in palettes so as to be grouped together for one or more of the services discussed herein. By way of further illustration, in another embodiment, two users may be considered a match only if their three most preferred palettes have the same ranking. By way of yet further illustration, two users may be considered a match only if their two most preferred palettes have the same ranking and they have the same least preferred palette.

Optionally, a first color palette may be considered the same as a second, different color palette if their respective primary colors are within a threshold distance. For example, the threshold may indicate a maximum color distance, wherein if the respective primary colors are less than the maximum color distance apart, color palettes are considered the same color palettes for purposes discussed herein. An example of such a formula is one based on a human perceptible color difference. Various color distance formula or models, such as CIEDE2000, CMC 1:c, or the like, can be utilized to compute color distance between colors, and the computed color distance may be compared to the threshold to determine whether the color distance falls within or outside of the threshold.

Optionally, a user may define how closely or loosely another user's color preferences need to be in order for the other user to be considered a suitable social network contact, and for one or more user interaction services to be provided with respect to the user. Optionally, a system operator provides such definition, or both a user and a system operator may contribute to the definition of how closely or loosely another user's color preferences need to be in order for one or more of user interaction services to be provided with respect to the user. As yet another option, a given user may opt-in or opt-out of one or more user interaction services. Users that have been determined to have sufficiently similar color preferences may be logically grouped together. As another option, a name is automatically generated for a grouping of users that have sufficiently similar color preferences. In yet another option, the generated group name may be based on, and include in whole or in part, a name of the color palette most preferred by the group (e.g., the "Greens").

In one embodiment, users having similar color preferences may be identified based at least in part on one or more affiliated color palettes. Thus, instead of matching one or more color preferences between users or determining that one or more color preferences between users falls within a specified range, color preferences of one user that otherwise coordinate or are affiliated with the color preferences of another user may be used to identify users. For example, a user may favor a particular impressionist era artist and thus is connected with other individuals who share an affinity for the same artist's work; however, the user may want to branch out and be introduced to other individuals who like different impressionist era artists or completely different artists, but which have some connection to the user's favored interests. In this case, an analysis and comparison of affiliated color palettes with one or more input colors or color palettes can be used to identify other users.

In another embodiment, aspects of the present disclosure leverage one or more data stores of color palettes that have been rated, ranked, and/or voted on by a community of people to indicate which color combinations are preferred by that community. Using an initial color or colors, such as an initial color palette, an ordered list of affiliated colors can be generated where each affiliated color is ranked based at least in part on the popularity of the combination of the initial color or colors with that affiliated color. The color palette can be supplemented by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the supplemented color palette has been determined by the community of people to be an appropriate or preferable color companion to the color or colors already in the palette. As an alternative to adding affiliated colors to the original color palette, the identified affiliated colors can be otherwise associated with the original color palette.

In accordance with an illustrative embodiment, an image processing service obtains, with respect to a first user, a color image depicting one or more items, a design, a scene, a photograph of the first user, or the like, and generates one or more palettes based on palette generation criteria. The palette generation criteria can be input by a user, a host of a commerce or other network site, a merchandise provider or vendor, a designer, an artist, or the like. Alternatively, or in addition, the palette generation criteria can be automatically generated by a computing device or system. The palette generation criteria may indicate various preferences, factors, parameters, thresholds, or requirements that facilitate or control a palette generation process.

Illustratively, the palette generation process may include various elements such as image pre-processing, color distribution generation, representative color identification, palette candidate generation, and/or palette determination. For example, the color image can be pre-processed prior to the generation of color distribution or identification of representative colors. The pre-processing can include de-noising, normalization, down sampling, area-marking, or the like. A color distribution can be generated based on color values corresponding to each pixel of a color image. Representative colors can then be identified based on the color distribution. For example, colors that are most distant from one another as measured by certain color distance formula(e) can be identified as representative colors. One or more thresholds can be utilized in the identification of representative colors to facilitate color merging or weighting. The identified representative colors with associated weight or other metadata may constitute a palette candidate corresponding to specific threshold settings as indicated by palette generation criteria. In some embodiments, multiple palette candidates can be generated by changing the threshold settings. A palette may be used as a color fingerprint for a given item, and so may be used to identify the item using color-related search terms. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

Continuing with the prior example and in accordance with a further illustrative embodiment, each of the one or more generated palettes or individual colors identified in the one or more generated palettes may be supplemented by one or more affiliated colors or otherwise associated with one or more affiliated colors. For example, in some embodiments, a first color can be selected by a program or a user and a plurality of palettes can be identified from a store of palettes that contain that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be ordered based on the assigned weights. The program or user can select an affiliated color from the ordered or weighted list to add to a custom color palette containing the initial color. When the selected affiliated color is added to the palette (or otherwise associated with the original color), a new list of affiliated colors can be generated based at least in part on the colors in the palette. This allows the program or user to continue to build the color palette (or the associated grouping of affiliated colors).

In other embodiments, two or more colors can be selected by a program or a user and a plurality of palettes can be identified from a data store of palettes that contain one or more of those colors (or sufficiently similar colors). A list of affiliated colors can be generated that includes a weight factor for each color, the weight factor based on the ranking, rating, and/or number of votes the containing palette has received. In certain implementations, the weight factor can be adjusted based on the relative popularity, rating, and/or ranking of the initial two or more colors. This may be accomplished, for example and without limitation, by decreasing the weight of colors affiliated with a relatively popular color and/or increasing the weight of colors affiliated with a relatively unpopular color. From the weighted list of affiliated colors, the program or user can select a color to add to the palette containing the initial two or more colors. When the selected affiliated color is added to the palette (or otherwise associated with the two or more initial colors), a new list of affiliated colors can be generated based at least in part on the two or more initial colors along with the new color added to the palette (or otherwise associated with the two or more initial colors). This allows the program or user to continue to build the color palette (or the associated grouping of affiliated colors).

Thus, by way of illustration, the social networking service may identify, to a first user, other users that have affinities for one or more affiliated color palettes generated at least in part on a first color or color palette corresponding to the first user. In addition or alternatively, one or more other user interaction services can be provided with respect to a user based at least in part on an analysis of affiliated color palettes.

In one embodiment, the color-related social network recommendation service may be provided to two or more users that have been determined to have sufficiently similar color preferences and may provide for sharing user information, such as profile information, purchase information, media, color palettes, etc., of one user with the other user. The profile information may include a user identifier (e.g., a user's actual name or an alias), a user's color preferences (e.g., top five most preferred color palettes in ranked order, three least preferred color palettes in ranked order, etc.), a user's preferred items (e.g., types of clothing or accessories preferred by a user), a user's preferred brands, a user's geographical location (e.g., by region, state, city, neighborhood, etc.), etc. By way of example, the purchase information for an item may include a unique item identifier, an item type identifier (e.g., a name, a Universal Product Code (UPC), a European Article Number (EAN), an International Standard Book Number (ISBN), etc.), an item category identifier, item color information (e.g., color palettes associated with the item), affiliated colors associated with the color palette of the item, item price, etc. Optionally, the shared purchase information may be provided in association with a link or other control via which the recipient user may initiate the purchase of the item from a commerce service.

In another embodiment, the color-related social network recommendation service may be provided to two or more users that have been determined to have sufficiently similar color preferences and may provide for enabling users to communicate with each other via a social networking page, short messages, emails, audio/video calls, and/or otherwise. In yet another embodiment, the color-related social network recommendation service may provide or access a voting service, where users of a group can vote on whether they like or dislike a color palette, or an item, or an item in a given color palette. The vote results may be shared among users having sufficiently similar color preferences.

Optionally, users that have been logically grouped together based at least in part on their color preferences may be extended an invitation to join the group. The color-related social network recommendation service may detect whether or not a given user accepted the invitation, and users that have not accepted the invitation or been provided with the invitation may be precluded from participating in certain or all interaction services with respect to the group. For example, a non-group member may be inhibited to communicating with other group members, from voting on color palettes and items, from receiving profile information of users in the group, etc. User interaction may be enabled on a social networking site, a commerce site, or elsewhere.

Overview of an Example Embodiment

FIG. 1 illustrates an embodiment of a color-related social network recommendation processing environment 100 that can implement the features described herein in the context of an example color-related social network recommendation service 102. In some embodiments, the color-related social network recommendation processing environment 100 includes the color-related social network recommendation service 102, an image processing service 104, an affiliated color service 105 a commerce service 106, a palette data store 110, a network 120, an item data store 130, a user account data store 132, third party users 140, social networking services 150, and color palette providers 160. In some embodiments, various components of the color-related social network recommendation processing environment 100 are communicatively interconnected with one another via the network 120. The color-related social network recommendation processing environment 100 may include different components, greater or fewer number of components, and can be structured differently. For example, there can be more than one data store or other computing devices in connection with the color-related social network recommendation service 102. As another example, components of the color-related social network recommendation processing environment 100 may communicate with one another with or without the network 120.

The image processing service 104 can correspond to any system capable of performing the associated processes described herein. The image processing service 104 may be implemented by one or more computing devices. For example, the image processing service 104 may be implemented by computing devices that include one or more processors to execute one or more instructions, memory, and communication devices to transmit and receive data over the network 120. In some embodiments, the image processing service 104 is implemented on one or more backend servers capable of communicating over a network. In other embodiments, the image processing service 104 is implemented by one or more virtual machines in a hosted computing environment (e.g., a "cloud" computing environment). The hosted computing environment may include one or more provisioned and released computing resources, which computing resources may include computing, networking or storage devices.

In one aspect, the image processing service 104 can correspond to one or more applications that perform, individually or in combination, the image processing functions described herein, including image pre-processing, color distribution generation, representative color identification, palette candidate generation, palette determination, etc. In another aspect, the image processing service 104 may be configured to store or update palettes at the palette data store 110. In some embodiments, the image processing service 104 is associated with a network or network-based merchandise provider or vendor. The image processing service 104 may access and process images from the item data store 102. In some embodiments, the images are provided by merchandisers or other parties for posting on a network site, for example, on a network page (e.g., a Web page presenting details regarding a particular item(s) (an "item detail page") and from which consumers can purchase the item. In yet other embodiments, the images are provided by consumers, provided by third party image data stores, or provided by other image sources. In the illustrated embodiment, the image processing service 104 is communicatively connected to the palette data store 110.

The affiliated color service 102 can correspond to any system capable of performing the associated processes described herein. The affiliated color service 102 may be implemented by one or more computing devices. For example, the affiliated color service 102 may be implemented by computing devices that include one or more processors to execute one or more instructions, memory, and communication devices to transmit and receive data over the network 120. In some embodiments, the affiliated color service 102 is implemented on one or more backend servers capable of communicating over a network. In certain embodiments, the affiliated color service 102 is implemented by one or more virtual machines in a hosted computing environment (e.g., a "cloud" computing environment).

In some aspects, the affiliated color service 102 can correspond to one or more applications that perform, individually or in combination, the functions described herein, including determining affiliated colors, assigning weights to affiliated colors, normalizing weights of affiliated colors, clustering or combining colors based on color distances, determining color similarity thresholds, updating affiliated colors based at least in part on updated palettes, etc. In certain aspects, the affiliated color service 102 may be configured to store or update palettes at the palette data store 110, and thus is communicatively connected to the palette data store 110. In some embodiments, the affiliated color service 102 is associated with a network or network-based merchandise provider or vendor.

The color-related social network recommendation service 102 can correspond to any system capable of performing the processes described herein. The color-related social network recommendation service 102 may be implemented by one or more computing devices. For example, the color-related social network recommendation service 102 may be implemented by computing devices that include one or more processors to execute one or more instructions, memory, and communication devices to transmit and receive data over the network 120. In some embodiments, the color-related social network recommendation service 102 is implemented on one or more backend servers capable of communicating over a network. In other embodiments, the color-related social network recommendation service 102 is implemented by one or more virtual machines in a hosted computing environment (e.g., a "cloud" computing environment).

In one aspect, the color-related social network recommendation service 102 can correspond to one or more applications that perform, individually or in combination, the recommendation and user interaction functions described herein, including one or more of identifying users that have similar color preferences and providing interaction services to such users, sharing user profile information, enabling such users to communicate, enabling such users to share color-related purchase information and color palettes, enabling such users to vote for colors and items, etc. Identification of users with similar color preferences may be based at least in part on a determination of one or more colors, palettes and/or items of a first user corresponding to matching or affiliated colors, palettes and/or items of one or more other users as will be further described herein. In another aspect, the color-related social network recommendation service 102 may be configured to identify and share color trends among users sharing color preferences.

The color-related social network recommendation service 102 may be communicatively connected to the palette data store 110. The palette data store 110 can generally include any repository, database, or information storage system that can store palette data and associated metadata.

The palette data stored in the palette data store 110 can be collections of colors, including collections of colors generated by a user and/or system based at least in part on human color preferences, optionally with an associated weight and date of creation. Palettes may be generated from images, such as user submitted images or item pages, using the image processing service 104. Palette data can be of various formats, such as lists, vectors, arrays, matrices, etc. Metadata can be associated with individual palettes, for purposes of textually indicating the color(s) included in the palette, and optionally indicating their format, tags, associations, sources, popularity, date(s)/time(s) of creation/editing, geo-location data, last update time, semantics, features, conditions, associated demographics (e.g., geographical region, age, gender, ethnic group, religion, culture, language, dialect, etc. of users that provided input used in creating the palette), or the like. The color palettes may have been ranked or voted on by people to indicate which combinations of colors are more preferable, visually appealing, popular, or the like. Such ranking and/or votes may be stored and may be used to weight color palettes. An example process of generating color palettes is discussed in greater detail below.

Using an initial color or colors, an ordered list of affiliated colors can be generated where a given affiliated color is ranked based at least in part on the popularity of the combination of the initial color or colors with that affiliated color. The color palette can be built by adding an affiliated color to the colors in the palette and then updating the list of affiliated colors to suggest new affiliated colors to add to the updated palette. The resulting color palette can be configured to contain a combination of colors that is visually appealing or preferable because each affiliated color used in generating the color palette has been determined by the community of people to be an appropriate or preferable color companion to the color or colors already in the palette.

The palettes generated using the affiliated color process may be used to provide color-related recommendations for colors or colored items that would go well with another color or colored item, or for various recommendations between users associated with such color affinities and/or items. Particular color palettes may be associated with a particular community that includes a biased population (e.g., that are related based on geographical region, age, gender, ethnic group, preferences, social network, etc.), such a group of users having similar color preferences. This enables providing recommended colors to users that have a known and/or inferred bias that corresponds to a palette of a community associated with such color palette bias.

In some embodiments, a first color can be selected by a program or a user and a plurality of palettes can be identified from a data store of palettes containing that color (or a sufficiently similar color). From those palettes, a list of affiliated colors can be generated by identifying the other colors in the palettes. For each affiliated color in the list, a weight can be assigned based on the ranking, rating, and/or number of votes the containing palette has received. The list of affiliated colors can be sorted based on the assigned weights. The program or user can select an affiliated color from the sorted list to add to a custom color palette containing the initial color. When the selected affiliated color is added to the palette, a new list of affiliated colors can be generated based at least in part on the colors in the palette that allows the program or user to continue to build the color palette. For more example details on extracting colors from an image to obtain a color palette, see U.S. patent application Ser. No. 14/316,483, now U.S. Pat. No. 9,401,032, entitled "IMAGE-BASED COLOR PALETTE GENERATION," filed on Jun. 26, 2014, which is incorporated by reference herein in its entirety. For more example details on identifying affiliated colors and/or building an affiliated color palette based at least in part on an input color or palette, such as an input color or palette identified from a reference image, see U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety.

The commerce service 106 may provide an electronic catalog to which third party users 140 may be provided access via respective user devices. For example, the commerce service 106 may provide network pages that each provide relevant details regarding a particular items(s) ("item detail pages". A given item detail document may include detailed information regarding an item (e.g., an item being offered for sale), such as one or more images, descriptive text, color name(s), a price, weight, size options, reviews of the item by other users or by professional reviewers, alternative similar items, and/or other information. Reviews of an item from users having the same or similar color preferences to the users accessing the item detail page may be given preferential display (e.g., displayed above or earlier than reviews that are not from users having similar color preferences, highlighted, associated with icons or text indicating the color preference similarity, etc.). The item detail page may also include controls via which the user can select among various versions of the item (e.g., size, color, etc.), and a purchase control via which the user can initiate purchase of the item (e.g., by adding the item to a shopping cart). The commerce service 106 may also provide third party users 140 with interfaces via which a user views information regarding users with similar color preferences, and via which users with similar color preferences can interact (e.g., share opinions on items, share purchase or browse history information, etc.).

While a commerce environment is often used as an example herein, it will be appreciated that the color recommendation service 106, as disclosed herein, may be used in a variety of environments other than a commerce environment. For example, aspects of the present disclosure, in some embodiments, may be used and/or implemented to efficiently recommend colors and color palettes to consumers, merchandisers, designers, architects, artists, landscapers, developers, gamers, students, etc. for virtually any purpose. Without limitation, aspects of the present disclosure may be used for efficient generation of color based recommendations for use in social networking contexts, digital photo albums, digital news articles, artistic works, content generation, design/architectural drawings, etc. just to name a few practical, non-limiting examples.

The network 120 may include any suitable combination of networking hardware and protocols necessary to establish communications within the color color-related social network recommendation processing environment 100. For example, the network 120 may include private networks such as local area networks (LANs) or wide area networks (WANs) as well as public or private wireless networks, satellite networks, cable networks, cellular networks, or the Internet. In such an embodiment, the network 120 may include hardware (e.g., modems, routers, switches, load balancers, proxy servers, etc.) and software (e.g., protocol stacks, accounting software, firewall/security software, etc.) that establish networking links within the color-related social network recommendation processing environment 100. Additionally, the network 120 may implement one of various communication protocols for transmitting data between components of the color-related social network recommendation processing environment 100.

The item data store 130 may correspond to or be associated with one or more sites and systems, such as a commerce network site providing the color-related social network recommendation service 102 or third party merchandise providers or vendors that may market items via the commerce network site providing the color-related social network recommendation service 102. The item data store 130 may be associated with any computing device(s) that can facilitate communication with the color-related social network recommendation service 102 and the commerce service 106 via the network 120. Such computing devices can generally include servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

The item data store 130 may have metadata/keywords that identify and/or describe the respective items. By way of example, the item data store 130 may store item records for respective items in one or more electronic catalogs including unique item identifiers, such as Universal Product Codes (UPC), European Article Numbers (EAN), International Standard Book Numbers (ISBN), and/or other identifiers. By way of further example, the item metadata may indicate the item type and/or category, such as "dress" and "clothing," or "blender" and "kitchen appliance." In addition, the item metadata may include text or another identifier (sometimes referred to herein as a "color name") identifying one or more colors of the item or of versions of the item, such as "red," "orange," "blue," etc. The metadata may further include such information as brand. Other data, such as price, may be included as metadata or otherwise made accessible. Still further, a given item record may include one or more images of the item, where the image may further be associated with metadata (e.g., identifying items in the image by item type, item category, unique identifier, identifying associated color palettes, etc.). Item record data may have been provided by an operator of a commerce site, by consumers, third party databases, and/or other sources. As used herein, the term "item," in addition to having its ordinary meaning, is used interchangeably to refer to an item itself (e.g., a particular product) and to its description or representation in a computer system or electronic catalog. As will be apparent from the context in which it is used, the term is also sometimes used herein to refer only to the item itself or only to its representation in the computer system.

The user account data store 132 may store user account information in respective user account records. A given user account record may include user purchase history information, such as the items a user has purchased and related metadata, such as the item color palette, the item types, the item category, the item price etc. A given user account record may also include user submitted data, such as image of the user's wardrobe or images of items the user likes. For example, a user may take images, e.g., photographs and/or videos of the user's wardrobe (e.g., dresses, shoes, blouses, pants, socks, other items of clothing, handbags, briefcases, earrings, necklaces, other jewelry, other accessories, etc.), and upload the images to a user account data store 132 (which may be provided in a host computing environment). The user may have manually provided metadata to be stored in association with the images (e.g., color, item type, item category, product identifiers, etc.). Alternatively or in addition, the color-related social network recommendation service 102 or other service may have automatically recognized via an object identification module the item(s) and its associated colors in a given user image and stored such information as metadata in association with the given user image. In addition, a user account record may store user profile information such as a user's color preferences and preference rankings, as well as a user's instructions regarding sharing information with other users, e.g., other users having similar color preferences. As noted above, the user's color preferences may be determined based on color palettes generated from the user submitted images, on explicit color preference indications provided by the user via surveys or otherwise, on the user's purchase or browse history, on social networking information, and/or other information.

Third party users 140 may correspond to visitors to a network site (e.g., a commerce network site providing the commerce service 106), such as consumers, designers, architects, or the like, and can be associated with any computing device(s) that can facilitate communication with the color-related social network recommendation service 102 via the network 120. Such computing devices can generally include wireless mobile devices (e.g., smart phones, PDAs, tablets, wearable computing devices, or the like), desktops, laptops, game platforms or consoles, electronic book readers, television set-top boxes, televisions (e.g., internet TVs), and computerized appliances, to name a few. Further, such computing devices can implement any type of software (such as a browser or a mobile media application) that can facilitate the communications described above.

Social networking services 150 may build social networks among users who share real-life connections, interests, and color-related preferences. The social network services 150 may include user profiles and social links with other users and groups, and may enable linked users to share information and communications, including text, audio, and still and video images via social networking pages, emails, short messaging services and otherwise.

The color palette providers 160 can create and/or curate color combinations based on the preferences of each provider's community of users. Particular color palette providers 160 may be associated with a particular community that includes a biased population or a population with unique or particular preferences. This may allow for the affiliated color service 105 to retrieve palettes with a known and/or desired bias depending at least in part on the use of the retrieved palettes. This may also allow for the affiliated color service 105 to reduce or remove the bias present in different communities by combining palettes from a plurality of communities of users.

The color palette providers 160 can be associated with any computing device(s) that can facilitate communication with the affiliated color service 105 via the network 120. Such computing devices can generally include network servers, desktops, laptops, wireless mobile devices (e.g., smart phones, PDAs, tablets, wearable computing devices, or the like), game platforms or consoles, electronic book readers, television set-top boxes, televisions (e.g., internet TVs), and computerized appliances, to name a few. Further, such computing devices can implement any type of software (such as a network server) that can facilitate the communications described above.

One skilled in the relevant art will appreciate that the example components and configurations provided in FIG. 1 are illustrative in nature. Accordingly, additional or alternative components and/or configurations, especially regarding the additional components, systems and subsystems for facilitating functions disclosed herein may be utilized.

Figure 2:
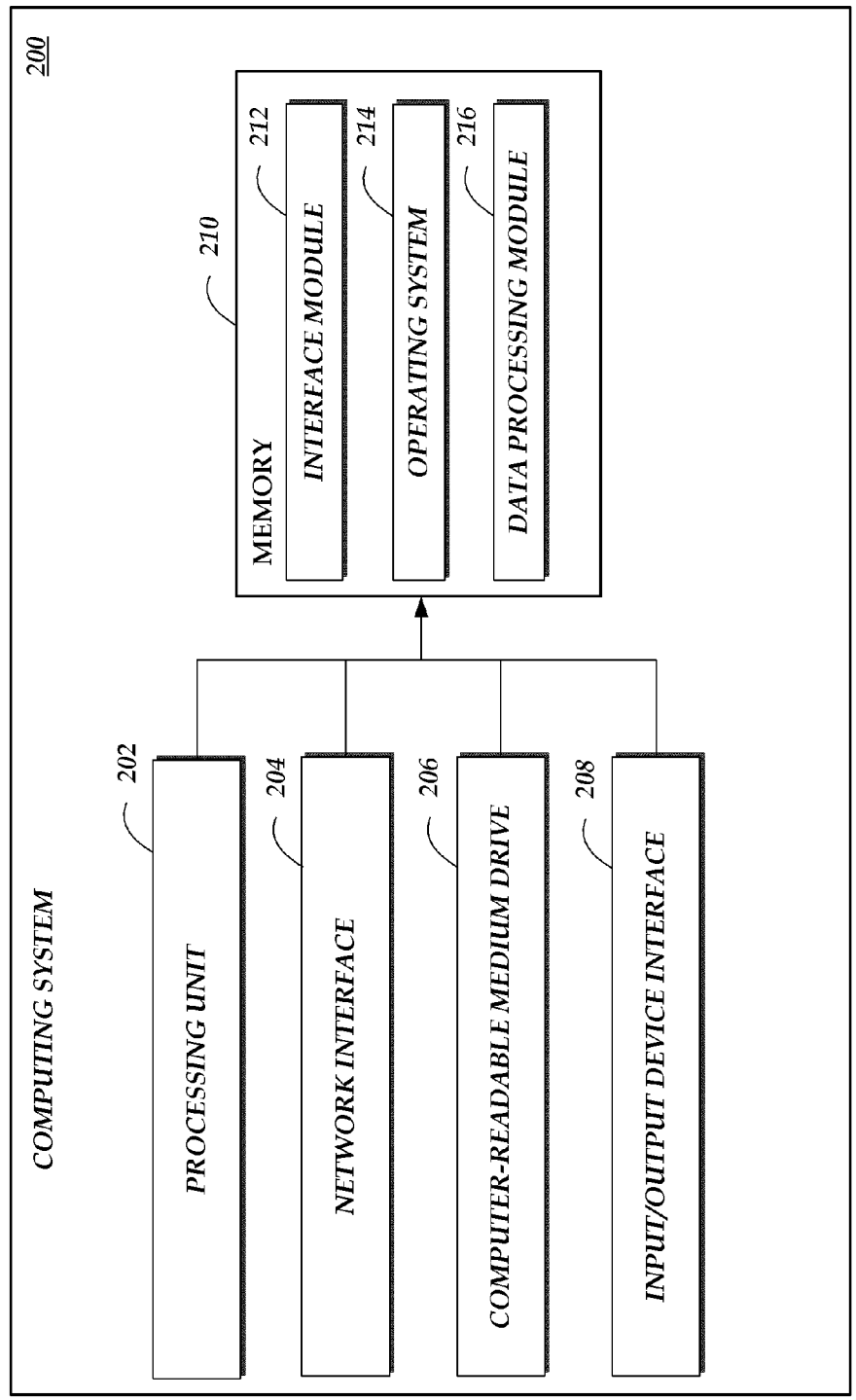
FIG. 2 is a block diagram illustrating an embodiment of example components of a computing system capable of providing the image processing service, color recommendation service and/or affiliated color service shown in FIG. 1.

FIG. 2 is a block diagram illustrating an embodiment of example components of a computing system capable of implementing a color-related social network recommendation service 102 utilized in accordance with the color-related social network recommendation processing environment 100 of FIG. 1. The computing system includes an arrangement of computer hardware and software components that may be used to implement aspects of the present disclosure. Those skilled in the art will appreciate that the computing system implementing the color-related social network recommendation service 102 may include more (or fewer) components than those depicted in FIG. 2. It is not necessary, however, that all of these generally conventional components be shown in order to provide an enabling disclosure.

The computing system implementing the color-related social network recommendation service 102 may include a processing unit 202, a network interface 204, a non-transitory computer-readable medium drive 206, and an input/output device interface 208, all of which may communicate with one another by way of a communication bus. The network interface 204 may provide the color-related social network recommendation service 102 with connectivity to one or more networks or computing systems. The processing unit 202 may thus receive information and instructions from other computing devices, systems, or services via a network. The processing unit 202 may also communicate to and from memory 210 and further provide output information via the input/output device interface 208. The input/output device interface 208 may also accept input from various input devices, such as a keyboard, mouse, digital pen, touch screen, etc.

The memory 210 may contain computer program instructions that the processing unit 202 may execute in order to implement one or more embodiments of the present disclosure. The memory 210 generally includes RAM, ROM and/or other persistent or non-transitory computer-readable storage media. The memory 210 may store an operating system 214 that provides computer program instructions for use by the processing unit 202 in the general administration and operation of the color-related social network recommendation service 102. The memory 210 may further include other information for implementing aspects of the present disclosure.

In one embodiment, the memory 210 includes an interface module 212. The interface module 212 can be configured to facilitate generating one or more user interfaces through which an item data store 130, a third party user 140, utilizing a compatible computing device, or a social networking service 150, may send to, or receive from, the color-related social network recommendation service 102 recommendations, image data, palette data, instruction data, metadata, etc., or otherwise communicate with the color-related social network recommendation service 102. Specifically, the interface module 212 can be configured to facilitate processing functions described herein, including generating palettes from images, determining and ranking user color preferences, identifying users with similar color preferences, enabling users with similar color preferences to network, share information and communicate, etc. For example, color information for a third party user 140 may be obtained from user submitted images, explicit color preference indications provided by the user via surveys or otherwise, via user searches (e.g., where the user search query includes a color name), from the user's purchase history, the user's browse history, from social networking information, and/or other information. The third party user may submit images, color preference information, and may interact with other users having similar color preferences via one or more generated user interfaces. The user interface can be implemented as a graphical user interface (GUI), Web-based user interface, computer program, smartphone or tablet program or application, touchscreen, wearable computing device interface, command line interface, gesture, voice, or text interface, etc., or any combination thereof.

In addition, the memory 210 may include a data processing module 216 that may be executed by the processing unit 202. In one embodiment, the data processing module 216 implements aspects of the present disclosure. For example, the data processing module 216 can be configured to process user images, instructions, item data from the item data store 130, palette data from the palette data store 110, data from the social networking service 150, or metadata to rank user color preferences and to identify users having similar color preferences.

It should be noted that the color-related social network recommendation service 102 may be implemented by some or all of the components present in the computing system as discussed herein with respect to FIG. 2. In addition, the computing system may include additional components not present in FIG. 2. The modules or components described above may also include additional modules or be implemented by computing devices that may not be depicted in FIG. 1 or 2. For example, although the interface module 212 and the data processing module 216 are identified in FIG. 2 as single modules, one skilled in the relevant art will appreciate that the modules may be implemented by two or more modules and in a distributed manner. As another example, the color-related social network recommendation service 102 and its components can be implemented by web servers, application servers, database servers, combinations of the same, or the like, configured to facilitate data transmission to and from third party users 140 and/or social networking services 150, via network 120. Accordingly, the depictions of the modules are illustrative in nature. Example routines will now be described with reference to the figures.

Figure 3:
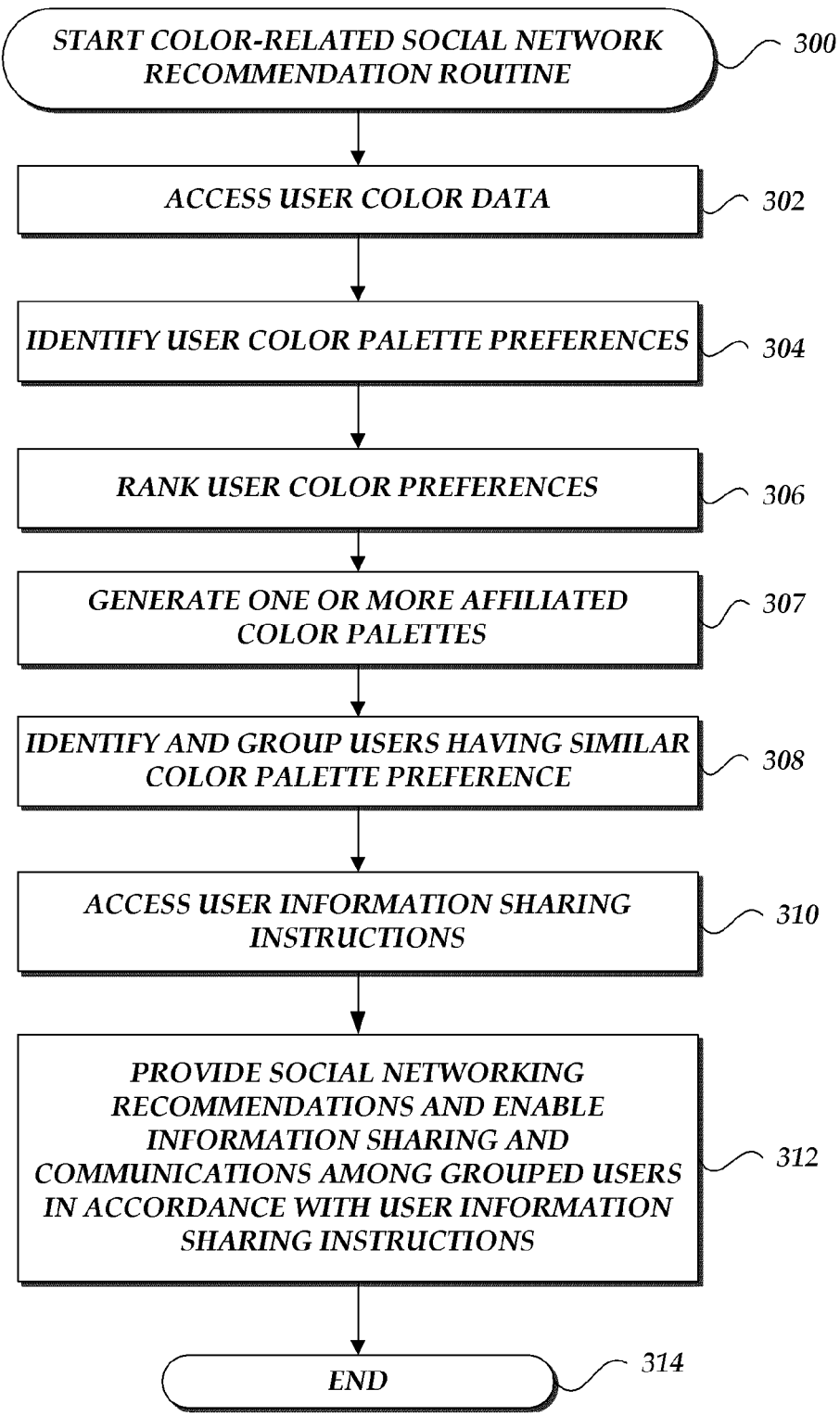
FIG. 3 is a flow diagram illustrating an example routine implemented by the color recommendation service for providing color-related social network recommendations.

Example Recommendation Process to Generate Color-Related Social Network Recommendations FIG. 3 is a flow diagram illustrating an example routine performed by the color-related social network recommendation service 102 for providing color-related social network recommendations based on user color-related data. The color-related social network recommendation service 102 starts the routine at block 300. At blocks 302 and 304, the color-related social network recommendation service 102 accesses user color data and identifies a user's color palette preferences, where a color palette may include one or more colors. By way of example, the user color data may be obtained from user submitted images, such as those that may be stored in the user account data store 132, by a social networking service 150, or elsewhere. The user images may be processed as discussed elsewhere herein to determine corresponding color palettes. By way of further example, user color data may be obtained from the user's browsing and posting history on the social network, such as from keywords on content browsed or posted by the user. For example, if a user posts articles or comments regarding a particular sports team, an inference may be made that the user may be interested in the sports team's colors. By way of further example, the color-related social network recommendation service 102 may provide a color preference survey user interface to a user device configured to prompt the user to indicate the user's preferred color palettes (e.g., the user's 3, 5, or 8 favorite color palettes) and optionally ranking of the user's preferred palettes. As another option, the user may be further prompted via the color preference survey user interface to indicate the user's least favorite color palettes (e.g., the user's 3, 5, or 8 least favorite color palettes). The color-related social network recommendation service 102 may receive and store the user's survey responses in the user account data store 132.

By way of yet further example, the color-related social network recommendation service 102 may access the user's purchase history from the commerce service 106 and/or the user account data store 132 to determine items the user has purchased or browsed, and color information associated with the items. By way of still further example, the color-related social network recommendation service 102 may access the user's social networking page from social networking services 150, access posted images of items that the user has indicated she likes (e.g., by providing a "like", thumbs up, or other positive indication with respect to the images) and process the images as discussed elsewhere herein to determine corresponding color palettes.

At block 306, the color-related social network recommendation service 102 optionally ranks the user's color preferences identified at block 304. If the color information is received from multiple sources, such as discussed above, the color preference information from the variety of sources may be combined to form a unified color preference determination. For example, a color preference score may be generated for a given color palette from color preference information regarding the given color palette from the variety of sources. Various color palettes may be ranked based on their relative score. In generating a unified color preference determination, color preference information from certain sources may be weighted differently than color preference information from other sources. The color preference indications may also be normalized. Optionally, the color information from different sources may be weighted the same. An example formula for calculating a color preference score from color preference indications of a ColorPreferenceSource from 1 to n sources with corresponding weightings is as follows:

Color Preference Score=$\Sigma$
(weight$_1$*ColorPreferenceSource$_1$+
weight$_2$*ColorPreferenceSource$_2$ . . .
weight$_n$*ColorPreferenceSource$_n$)

Optionally, in order to identify colors the user may potentially like, the color-related social network recommendation service 102 may identify clusters of colors within a color space of colors between those colors the user prefers (e.g., the user's top ranked three colors) and those colors the user does not like (e.g., the user's bottom ranked three colors).

In some embodiments, a user's color preference may simply be a selected input color or a selected input color palette, where the selection may be made by the user (directly or indirectly, such as through selection of an image or an item with corresponding textual or image color data) or automatically by the social networking service 150 and/or the color-related recommendation service 102. In one embodiment, the input color or color palette may be determined from one or more images corresponding to the user and/or indicative of one or more affinities of the user.

At block 307, the color-related social network recommendation service 102 optionally processes the user color palette preference(s) to generate one or more affiliated color palettes. In one embodiment, where the user's color palette preference corresponds to an input color or color palette, this processing involves determining affiliated colors to combine with the input color or color palette to generate an affiliated color palette. The determination of affiliated colors from an input color or color palette is further addressed below in reference to FIGS. 5-8.

In another embodiment, where the user's color palette preference corresponds to an input image, processing the input color or color palette corresponding to the user's color palette preference(s) the color-related social network recommendation service 102 processes the input image to generate an affiliated color palette associated with the input image. In one instance, the affiliated color palette is a color palette having a first color corresponding to a color in a color palette corresponding to the input image and one or more additional colors not in the color palette corresponding to the input image. The additional colors can be determined in a number of ways that are further described below in reference to FIGS. 5-8. As one example, the additional colors are identified based at least in part on the one or more additional colors being included in other color palettes having the first color and a rating corresponding to individual ones of the other color palettes. In another embodiment, the affiliated color palette is a color palette having a first color within a color range of a color in a color palette corresponding to the first image and one or more additional colors outside a color range of any individual color identified in the color palette corresponding to the first image. Again, these additional colors can be determined in a number of ways, which are further described below in reference to FIGS. 5-8.

At block 308, users that have similar color preferences are determined according to one or more color preference rules. By way of illustration, in accordance with a color preference rule, the color-related social network recommendation service 102 may identify users that have the same most preferred color palette, and/or may identify users that have the same or sufficiently similar ranking of multiple preferred color palettes, for at least a portion of the user's ranking (e.g., the top four ranked color palettes). By way of illustration, the color-related social network recommendation service 102 may identify users that have the same most preferred color palette, and/or may identify users that have the same color palettes in a group of color palettes, although they may have different ranking orders within the group. As another, the color-related social network recommendation service 102 may identify users that have the same most preferred palette and the same next two most preferred palettes, even though the ranking of the next two most preferred palettes may differ. In this example if User 1 and User 2 have the same most preferred palette (palette A), and User 1's second most preferred palette is palette B and third most preferred palette is palette C, while User 2's second most preferred palette is palette C and third most preferred palette is palette B, then User 1 and User 2 will be identified as "matching users" with similar enough tastes in palettes so as to be grouped together for one or more of the services discussed herein. Optionally, users with the same or sufficiently similar color preferences may be assigned to a group for purposes of one or more services (e.g., information sharing and communications among users assigned to a group). The group may be a color-based group that is associated with one or more color palettes used to define the group.

Optionally, a user may define via a user interface a color preference rule specifying how closely or loosely another user's color preferences need to be in order for one or more of user interaction services to be provided with respect to the user. Optionally, a system operator provides such definition or both a user and a system operator may contribute to the definition of how closely or loosely another user's color preferences need to be in order for one or more of user interaction services to be provided with respect to the user. Such definitions may be accessed and used by the color-related social network recommendation service 102 in determining whether a given user is to be assigned to a given color-based group. For example, the user's definition may be accessed from the user's account record stored in user account data store 132.

Optionally, a color palette may be considered the same as a different color palette if their respective primary colors are within a threshold distance. For example, the threshold may indicate a maximum color distance, wherein if the respective primary colors are less than the maximum color distance apart, color palettes are considered the same color palettes for purposes discussed herein. Thus, if two users ranked two different color palettes as their most preferred palettes, but the two color palettes are within a specified threshold, the color palettes may be considered the same. Optionally, the threshold may be specified by the user via a user interface, a system operator, or otherwise. For more example details on determining color distance, see U.S. patent application Ser. No. 14/316,483, now U.S. Pat. No. 9,401,032, entitled "IMAGE-BASED COLOR PALETTE GENERATION," filed on Jun. 26, 2014, and U.S. patent application Ser. No. 14/316,292, entitled "BUILDING A PALETTE OF COL- ORS BASED ON HUMAN COLOR PREFERENCES," filed on Jun. 26, 2014, which are incorporated by reference herein in their entirety.

Optionally, users may be identified based at least in part on one or more affiliated color palettes determined at block 307. While affiliated color palettes may have more divergent colors from color palettes that more directly correspond to a user's color preferences, identifying users at least based in part on these affiliated color palettes may result in such identified users inspiring the user to expand the user's color preferences by sharing items and color-related recommendations that do not have a high correlation to the user's current preferred colors.

At block 310, the user's information sharing instructions are accessed. For example, the user's information sharing instructions may be accessed from the user's account record stored in user account data store 132 or may be dynamically specified by the user via a user interface. The information instructions may indicate one or more of the following:

- whether the user is to be identified to other users in a color-based group;
- whether all of the user's purchases made via one or more commerce services (e.g., commerce service 106) are to be shared with other users in a color-based group;
- whether the user's purchases of items, made via one or more commerce services (e.g., commerce service 106), having a color palette used in defining the group are to be shared with other users in a color-based group;
- whether the user is willing to receive communications from other members of the color-based group and in what form (e.g., via the user's social networking page, via a short messaging service, via an email, or otherwise);
- whether the user is willing to receive still and/or video images from other members of the color-based group;
- whether the user is willing to receive color palette recommendations;
- whether the user is willing to receive survey/opinion requests from other members of the color-based group; and/or
- whether the user is willing to receive opinions/reviews from other members of the color-based group.

At block 312, the color-related social network recommendation service 102 enables the user to receive and provide information and communications to other members of the color-based group in conformance with the user instructions discussed above with respect to block 310. The information and communications may be provided via pages served by the commerce service 106, the social networking services 150, via email, short messaging services (e.g., SMS messages), audible communications, and/or otherwise. For example, the color-related social network recommendation service 102 may recommend the user to other users as recommended social networking partners or group members. The color-related social network recommendation service 102 may identify other members of the color-based group to the user. The color-related social network recommendation service 102 may identify and recommend to the user other users having the same or similar color preferences with whom the user can selectively network.

Optionally, the color-related social network recommendation service 102 may generate and provide recommendations, such as recommendations of items available from the commerce service 106, to members of a color-based group based at least in part on the color palettes associated with the group and/or group members. For more example details on providing color-based item recommendations, see U.S. patent application Ser. No. 14/315,855, entitled "AUTOMATIC COLOR PALETTE BASED RECOMMENDATIONS," filed on Jun. 26, 2014, and U.S. patent application Ser. No. 14/316,467, entitled "AUTOMATIC COLOR PALETTE BASED RECOMMENDATIONS FOR AFFILIATED COLORS," filed Jun. 26, 2014, which is incorporated by reference herein in its entirety. The color-related social network recommendation service 102 ends the routine at block 314.

Example Palette Generation Process

Figure 4:
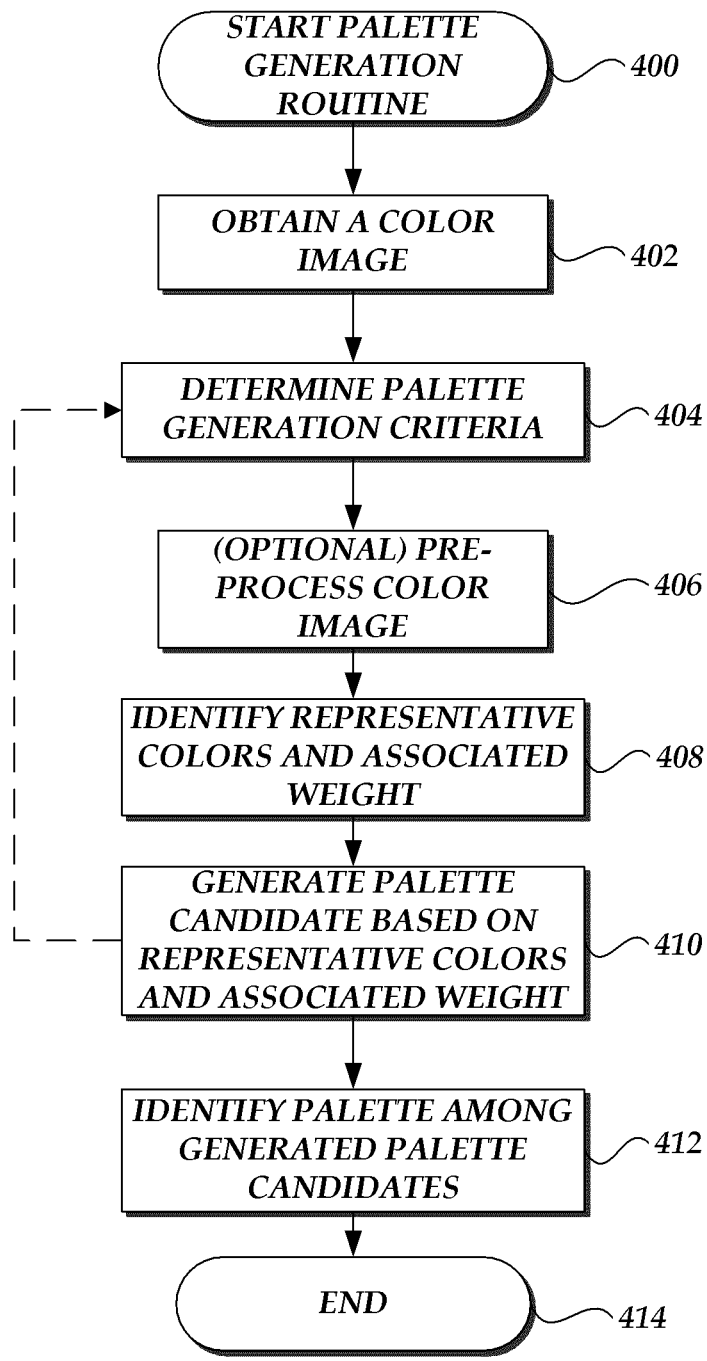
FIG. 4 is a flow diagram illustrating an embodiment of a palette generation routine implemented by the image processing service.

FIG. 4 is a flow diagram illustrating an embodiment of a palette generation routine 400 implemented by an image processing service 104. Routine 400 begins at block 402, where the image processing service 104 obtains a color image. The color image can depict one or more items, a design, a scene, a landscape, or any other content of color. Obtaining the color image can be accomplished by receiving image data from image sources, such as from item data store 130, user account data store 132, third party users 140, or social networking service 150, via image data transmission to the image processing service 104.

Metadata associated with the color image can also be obtained. The metadata may include information corresponding to the colors (e.g., color names), color scheme, lighting source, lighting direction, or other factors regarding the color rendering of the image. The metadata may also include information about currently obtained color image, other color images, subjects or category of subjects depicted, sources contributing to the image, or their interrelations. The metadata can further include any other information associated with the color image as can be envisioned by a person of skill in the art.

At block 404, palette generation criteria are determined. The palette generation criteria can be inputted by an image source provider or a third party user 140, who may correspond to a host of a commerce network site, a merchandise provider or vendor, a visitor to the commerce network site, a consumer, a designer, an artist, an architect, or the like. Alternatively, or in addition, the palette generation criteria can be automatically generated by the image processing service 104, or another computing device or system. For example, features or patterns exhibited by the color image as well as associated metadata can be considered by an automated process to determine the palette generation criteria.

The palette generation criteria may indicate various preferences, factors, parameters, thresholds, or requirements that facilitate or control the palette generation routine 400 performed by image processing service 104. For example, the palette generation criteria may indicate a computational method for pre-processing the obtained color image, for generating a color distribution, for identifying representative colors, for generating palette candidates, or for determining a palette. The palette generation criteria may also indicate parameters, thresholds, restraints, formula, or other factors that may inform various computational methods applicable to routine 400 or subroutines that it may invoke. For example, the palette generation criteria can identify a color distance formula or can include one or more thresholds of color distance for merging similar colors when representative colors are identified from a color image.

In some embodiments, the obtained color image is pre-processed at block 406. For example, the color image may be converted to a format compatible with the palette generation routine 400 or its subroutines. The color image may also be classified or prioritized based on applicable metadata. Further, pre-processing can include noise removal, rotation, re-orientation, normalization in shape, size, resolution, or color, or other manipulations to facilitate relevant processes and methods.

Still further, pre-processing may include area marking or labeling within the color image. For example, various contour matching algorithms can be employed to mark out an area of interest. Alternatively, or in addition, areas of interest can be manually marked out. In some embodiments, a background can be removed during pre-processing through area marking or labeling. In another embodiment, one or more areas of interest can be cropped or extracted so that only these areas form the basis for palette generation. In still another embodiment, area marking or labeling may indicate colors that should be treated in a specific way, such as to be ignored, to be associated with more or less weight, to disambiguate to a greater or lesser extent. Information corresponding to pre-processing can be included in corresponding metadata that is associated with the color image, which can facilitate palette generation.

At block 408, representative colors and their associated weight are identified from the obtained color image. The identification of representative colors may include multiple subroutines or subelements. Various image processing or clustering algorithms can be employed to achieve this. In some embodiments, a color distribution, such as a histogram illustrating distinct colors with their corresponding weight, is generated based on the color image. For example, the color distribution can be generated by invoking subroutine 400 as illustrated in FIG. 4 and as will be further described below. The generation of color distribution can be facilitated or controlled by information included in the palette generation criteria. For example, the palette generation criteria can indicate a set of standardized colors and/or binning criteria as bases for generating the color distribution. Once the color distribution is generated, representative colors can be identified based on the color distribution. The identification of representative colors can be facilitated or controlled by information included in the palette generation criteria or the metadata associated with the color image.

At block 410, a palette candidate is generated to include at least a subset of the identified representative colors and their associated weight. The palette candidate may further include metadata associated with the identified representative colors and weight.

In some embodiments, the palette generation criteria may specify or indicate criteria for determining which identified representative colors can be included in a palette candidate. For example, identified representative colors can each be associated with a weight. The palette generation criteria may indicate a threshold on the weights associated with identified colors to filter out colors that are relatively insignificant in the color image. The threshold can be dynamically generated based on a weight distribution of the identified representative colors. For example, the palette candidate can exclude identified representative colors associated with a weight lower than two standard deviations from a mean weight. Optionally, the image processing service 104 can move back to block 404, where new palette generation criteria can be determined. Based on the new palette generation criteria, a new palette candidate can be generated.

At block 412, one or more palettes can be identified among previously generated palette candidate(s). In some embodiments, each generated palette candidate is automatically considered a final palette so additional identification is not required at block 412. In other embodiments, one or more palettes are identified among multiple palette candidates based on palette generation criteria, which may indicate whether the identification should be performed manually or automatically, which attributes should be examined, or what standards should be applied to the identification, or the like.

Identification of palettes can be accomplished manually. For example, by repeating the part of routine 400 from block 404 to block 410, a third party user 140 may experiment with various palette generation criteria settings that can lead to generation of multiple palette candidates. In other words, each generated palette candidate can correspond to a distinct setting of palette generation criteria. The third party user 140 may then select one or more of the candidates and label them as palettes associated with the color image. Alternatively, or in addition, the identification of palettes can be accomplished automatically by the image processing service 104, or by another computing device or system. For example, information associated with change of color values and associated weight across various palette candidates can be considered a function of certain settings included in palette generation criteria corresponding to the various palette candidates. Accordingly, various optimization algorithms, such as gradient methods, dynamic programming, evolutionary algorithms, combinatorial optimization, or stochastic optimization, can be utilized to pick a palette candidate(s) that achieves an optimization based on the function. Illustratively, a palette candidate can be selected if a corresponding rate of color value change is close to zero, as measured in accordance with the function.

Once identified, the one or more palettes can be stored at the palette data store 110, by either creating new data entries or updating existing palettes. The image processing service 104 then ends the routine at block 714. Depending on relevant requirements or preferences indicated in the palette generation criteria corresponding to identified palettes, various metadata can be associated therewith, for purposes of indicating their format, semantics, features, conditions, or the like. In some embodiments, metadata can link a palette to a corresponding color image from which the palette is derived. Alternatively, or in addition, metadata may indicate a category or a position in a taxonomy associated with the corresponding color image. Metadata can also indicate patterns, colocations, or other attributes of spatial distribution of palette colors within the corresponding color image.

For more example details on extracting colors from an image and building a color palette, see U.S. patent application Ser. No. 14/316,483, now U.S. Pat. No. 9,401,032, entitled "IMAGE-BASED COLOR PALETTE GENERATION," filed on Jun. 26, 2014, and U.S. patent application Ser. No. 14/316,292, entitled "BUILDING A PALETTE OF COLORS BASED ON HUMAN COLOR PREFERENCES," filed on Jun. 26, 2014, which are incorporated by reference herein in their entirety.

Example Process to Generate a List of Affiliated Colors

Figure 5:
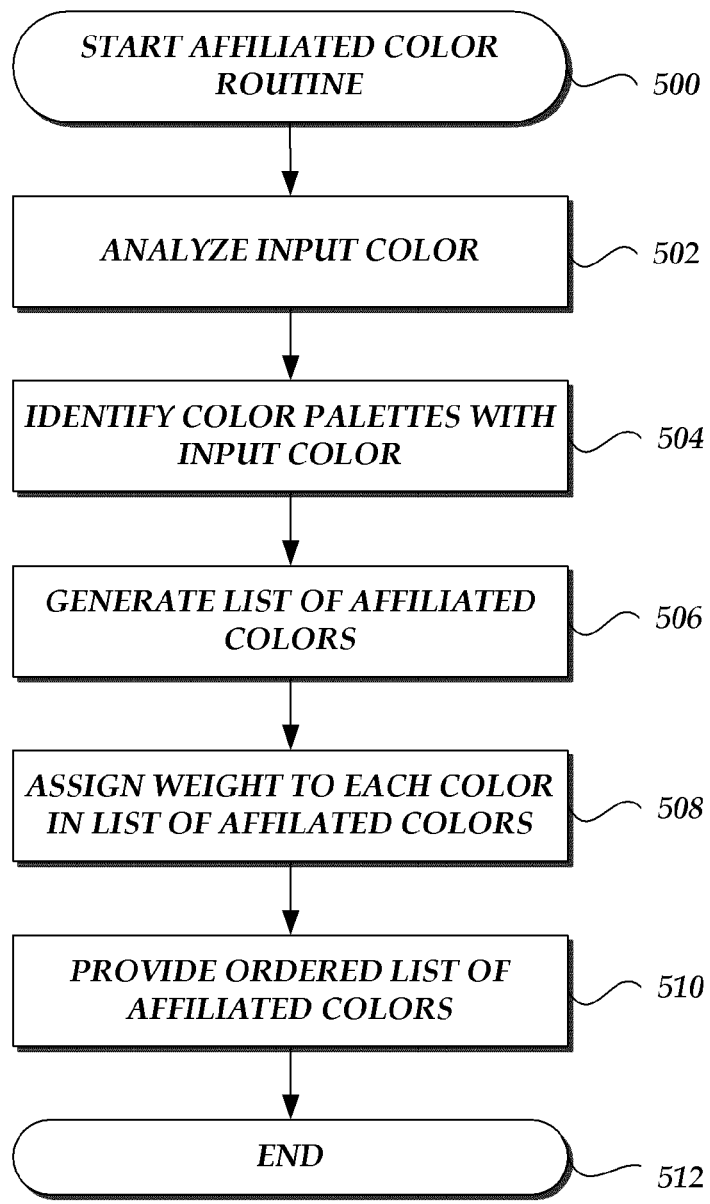
FIG. 5 is a flow diagram illustrating an embodiment of a routine implemented by the affiliated color service for generating an ordered list of affiliated colors.

FIG. 5 illustrates a flow diagram of an example routine implemented by the affiliated color service 105 for generating a weighted or ordered list of affiliated colors. Affiliated color service 105 begins the routine at block 500. At block 502, the affiliated color service 105 analyzes an input color. The input color can be received from a user (e.g., a third party user 140 via data transmission to the affiliated color service 105), from another system, or generated randomly. In some embodiments, the input color can be extracted from an image, such as an image provided by a user or an image of an item in an item catalog or on a network site (e.g., a social networking site operated by the social networking service 150). For more details on extracting colors from an image, see FIG. 4 and the corresponding description above, as well as U.S. patent application Ser. No. 14/316,483, now U.S. Pat. No. 9,401,032, entitled "IMAGE-BASED COLOR PALETTE GENERATION," filed on Jun. 26, 2014, which is incorporated by reference herein in its entirety.

In some embodiments, the input color is determined based at least in part on preferences, behavior, or properties of a user. A system can analyze properties of the user and determine one or more colors that the user is likely to prefer. For example, the affiliated color service 105, or other system, may have access to a user profile (such as through a social networking site operated by the social networking service 150) which includes, for example and without limitation, media preferences (e.g., preferred movies, TV shows, books, music, etc.), purchase history (e.g., items purchased in an electronic marketplace), browse history, demographics (e.g., age, gender, nationality, etc.), geographical location (e.g., where the user resides and/or previously resided), item preferences (e.g., through the use of wish lists), and the like. The affiliated color service 105 can analyze such information and determine probable colors that the user would like. One or more of these colors determined by the affiliated color service 105 can be used as the input color. As another example, the affiliated color service 105, or other system, can compare users to determine an input color. For a particular user, the affiliated color service 105 can analyze the color preferences of similar users (e.g., where similarity of users can be based at least in part on purchase history, browse history, media preferences, demographics, etc.) to determine one or more input colors that the particular user would prefer. This can be done by identifying another user with similar preferences and/or by aggregating user profile information to identify color preferences for an average user with similar preferences. As another example, the affiliated color service 105 can analyze images that a user has "liked" through the social networking service 150 to determine one or more input colors.

In block 502, analyzing the input color can include determining the components of the color, such as the primary color values (e.g., RGB values), the luminance-chrominance values (e.g., YUV or YCbCr values), or the like. Analyzing the input color can also include determining a threshold within which a color will be considered to be the same as, or sufficiently similar to, the input color. The threshold can be based on color distance according to a color distance formula. An example of such a formula is based on a human perceptible color difference. Various systems and methods for determining a human perceptible color difference and the human color distance formula, are described in U.S. patent application Ser. No. 14/316,483, now U.S. Pat. No. 9,401,032 entitled "IMAGE-BASED COLOR PALETTE GENERATION," filed on Jun. 26, 2014, U.S. patent application Ser. No. 14/316,530, now U.S. Pat. No. 9,245,350, entitled "IMAGE-BASED COLOR PALETTE GENERATION," filed on Jun. 26, 2014, U.S. patent application Ser. No. 14/316,528, now U.S. Pat. No. 9,177,391, entitled "IMAGE-BASED COLOR PALETTE GENERATION," filed on Jun. 26, 2014, and U.S. patent application Ser. No. 14/316,549, now U.S. Pat. No. 9,311,889, entitled "IMAGE-BASED COLOR PALETTE GENERATION," filed on Jun. 26, 2014, each of which is incorporated by reference herein in its entirety.

At block 504, the affiliated color service 105 identifies a plurality of color palettes that include the input color. The color palettes can be provided by the color palette providers 160. In some embodiments, one or more color palettes can be provided by the palette data store 110 where the palettes stored therein have been voted on, ranked, and/or rated. In some embodiments, the plurality of color palettes can be provided by the third party users 140 and/or the social networking service 150.

The affiliated color service 105 determines that a palette contains the input color when that palette has at least one color that falls within the threshold color distance from the input color, as determined at block 502. In this way, palettes including colors that are not identical to the input color, but including colors that are sufficiently close to the input color are included in the list of palettes identified at block 504. In some embodiments, the affiliated color service 105 can use a fast color indexing routine to pull colors from the palettes, as described in U.S. patent application Ser. No. 14/315,700, entitled "FAST COLOR SEARCHING," filed on Jun. 26, 2014, which is incorporated by reference herein in its entirety.

At block 506, the affiliated color service 105 generates a list of affiliated colors. The list of affiliated colors comprises the colors from the list of palettes identified at block 504, excluding the input color and those colors that are sufficiently close to the input color. In some embodiments, the list of affiliated colors can include all the colors from the list of palettes. In certain embodiments, the list of affiliated colors is concatenated based at least in part on a threshold number of colors to include in the list, a desired or targeted color variety, color exclusion rules, or the like.

At block 508, the affiliated color service 105 assigns weights to each color in the list of affiliated colors. The affiliated color service 105 loops through each color in the list, identifies from which palette the color originated, and adjusts a weight of the color based at least in part on the ranking, rating, and/or number of votes associated with the originating palette. Adjusting the weight of the color can include increasing the weight factor by a number of votes or average rating of the originating palette. In some embodiments, adjusting the weight of the color includes scaling the ranking, rating, and/or number of votes based at least in part on a number of factors, including without limitation, which users voted on the palette, the age of the palette, the number of comments on the palette, the geographical location of the voters, and the like. In some embodiments, the ranking, rating, and/or voting of a palette is distributed among the colors within a particular palette based at least in part on color popularity, ranking of colors within a palette, or the like. In certain embodiments, each color in a palette has an individual ranking, rating, and/or number of votes where the rating can be associated with the rating of the palette or independent from the rating of the palette.

Where a color appears in more than one palette, the weight of that color can be determined at least in part by aggregating the weights from each originating palette. One aggregation method is to add the weights of each originating palette. As an example of a simple case, where a color appears in 3 palettes, the weight of that color can be equal to the sum of the votes of each of the 3 palettes. It is to be understood that other weight aggregation schemes can be used without departing from the scope of this disclosure. For example, weights can be aggregated using a weighted average of votes, an arithmetic mean of votes, or using some other algorithm (where votes can be the number of votes for a palette, the average rating of a palette, or the ranking of a palette). Weight aggregation can also be configured to account for rating of a palette or color as a function of time and/or geographical location.

The affiliated color service 105 can use a similar color distance threshold when aggregating weights for an affiliated color. For example, a color distance threshold can be used such that when the affiliated color service 105 is determining a weight for an affiliated color, it aggregates the votes from the palettes containing that affiliated color and the palettes that contain a color with a distance from the affiliated color that is less than or equal to the color distance threshold. The color distance threshold used in analyzing the input color at block 502 and the color distance threshold used in weighting affiliated colors at block 508 can be the same or different and may be based on the same or different color distance algorithms.

At block 510, the affiliated color service 105 tallies the weights of each color and provides a weighted, ordered, and/or ranked list of affiliated colors, where the rank of an affiliated color is based at least in part on the relative weight of the color. The affiliated color service 105 can concatenate the ordered list of affiliated colors based at least in part on a desired or targeted number of colors to include in the list, a threshold weight factor to include in the list, a variety of colors in the list, color exclusion rules, or the like. The affiliated color service 105 ends the routine at block 512.

Figure 6:
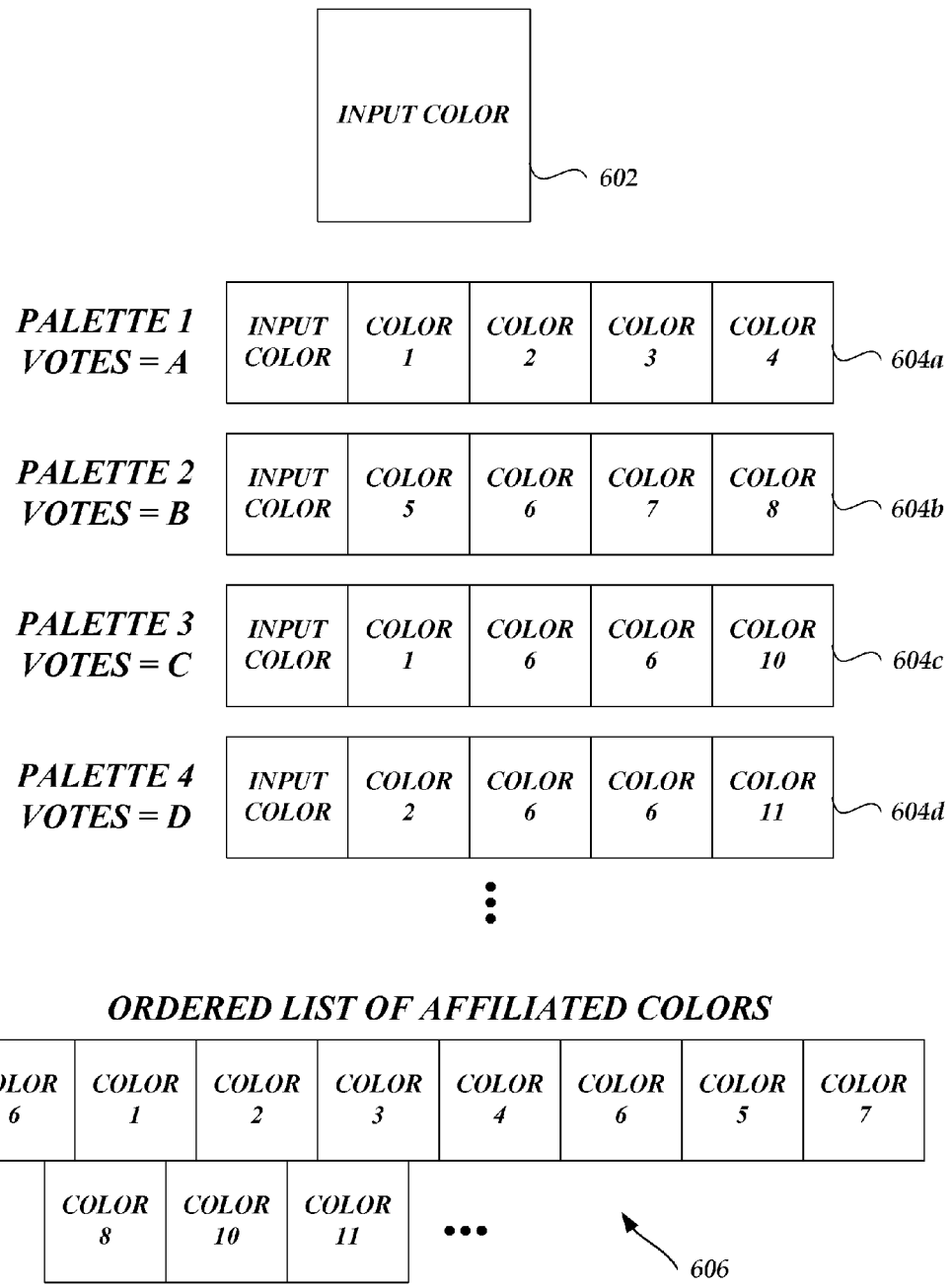
FIG. 6 illustrates an example ordered list of affiliated colors generated by the example routine of FIG. 5.

FIG. 6 illustrates an example list of affiliated colors 600 generated by the example routine of FIG. 5. Starting with the input color 602, the affiliated color service 105 identifies a number of palettes 604*a*-604*d*, each of which includes the input color or a color sufficiently similar to the input color (e.g., where the color distance between the color in the palette and the input color is less than a color distance threshold). The palettes 604*a*-604*d* can be from a data store of human- or machine-created color palettes, but which have been voted on, ranked, or rated by a community of users. As used herein, the terms votes, rating, and/or ranking are used to indicate that there is a value associated with the palette where the value is indicative of a level of human preference for the palette. Where only a single term is used (e.g., only vote, ranking, or rating), it is to be understood that the other terms could also be used. The rating of a color palette can be based on a number of votes, such as where a palette's score can be incremented by a value according to a positive vote by a user, or similarly decremented by a value according to a negative vote by a user. Similarly, the rating of a color palette can be based on a rating system where users can rate palettes on a rating scale (e.g., 0 to 5, 1 to 5, 0 to 10, −5 to 5, etc.). Likewise, the rating of a color palette can be based on users ranking palettes relative to one another.

Each time a palette is identified that contains the input color, or a color sufficiently close to the input color, each of the other colors in the palette is added to a list of affiliated colors. Each of the colors on the list of affiliated colors receives a weight that corresponds to the rating of the originating palette. For example, each of colors 1-4 in palette 1 604*a* is assigned a weight corresponding to the number of votes for palette 1 604*a*, represented by the variable A. Likewise, each of the colors in palettes 2-4 604*b*-604*d* is assigned a weight corresponding to the number of votes for each palette, represented by the variables B-D.

If a color is found in more than one palette, the weight of the color is adjusted based on the rating of each of the originating palettes. For example, color 1 is found in palette 1 and palette 3, so the weight of color 1 is based on the number of votes A+C. In some embodiments, an affiliated color is considered to be found on another palette (e.g., other than its originating palette) when the color in the other palette has a color distance that is less than a color distance threshold from the affiliated color. In some embodiments, the weighting of colors is analyzed as a function of position in a color space where the distribution of weighted colors is analyzed to determine maximums. This may be able to provide additional details about which colors are generally considered to go well with the input color, which may result in the ability to provide multiple suggestions of colors within and/or around a peak color in the color space.

In some embodiments, the list of affiliated colors is adjusted to combine colors that are close to one another based at least in part on a color distance formula. This step can be used to decrease the number of different colors where some colors are sufficiently similar to one another. This can be used to reduce the number of variations of a color, especially where the variations are insignificant, imperceptible, or otherwise lacking in value to a user.

Once the weights of each affiliated color are determined, a weighted or ordered list of affiliated colors 606 can be provided. The ordered list can include all the different colors from the palettes 604*a*-604*d* or it can contain a subset of these colors. The ordering of the list can be based at least in part on the weight of each color (e.g., higher weighted colors are ranked higher). As illustrated in the figure, the colors 1-11 are ranked according to the sum of the votes for each color, where A is greater than B that is greater than C that is greater than D. Accordingly, using an aggregation scheme based on the sum of weights, color 6 has a weight of B+C+D, color 1 has a weight of A+C, color 2 has a weight of A+D, etc.

In some embodiments, the ratings of the palettes are time-dependent. The affiliated color service 105 can use the time-dependent ratings to identify trends in color combinations and/or to identify color combinations that are relatively stable over time (e.g., classic color combinations). This can also be used to determine color combinations that were popular at a particular time.

Time-dependent ratings can also be used to predict color trends in the future. For example, the most popular colors can be tracked as a function of time, with the result plotted in a color space. The path through the color space of the most popular color (e.g., which color is the most popular color at a point in time) can be used to project what the most popular color will be at some point in the future. For example, the affiliated color service 105 can determine a directional shift of the most popular color within the color space as a function of time and project based on the directional shift. The affiliated color service 105 can then provide suggestions of color combinations based on projections of which colors will be popular at a point in time. This may be useful, for example, for visual artists to predict trends in colors and/or color combinations. It is to be understood that this projection technique can be used for the most popular color as well as the second most popular, third most popular, etc. It is also to be understood that this projection technique can be used for color palettes as well as individual colors.

In some embodiments, geographical information can be included with the ratings of the palettes (e.g., ratings of a palette can be provided as a function of location of the voting user). The affiliated color service 105 can use the geography-associated ratings to identify color combinations that are generally associated with a geographical location. For example, users within a geographical region may prefer a color combination associated with a sports team from that geographical region. The affiliated color service 105 can use information about the user (e.g., where the user is located) to suggest color combinations that utilize the geography-associated ratings of palettes.

Example Affiliated Color Palette Generation Process

Figure 7:
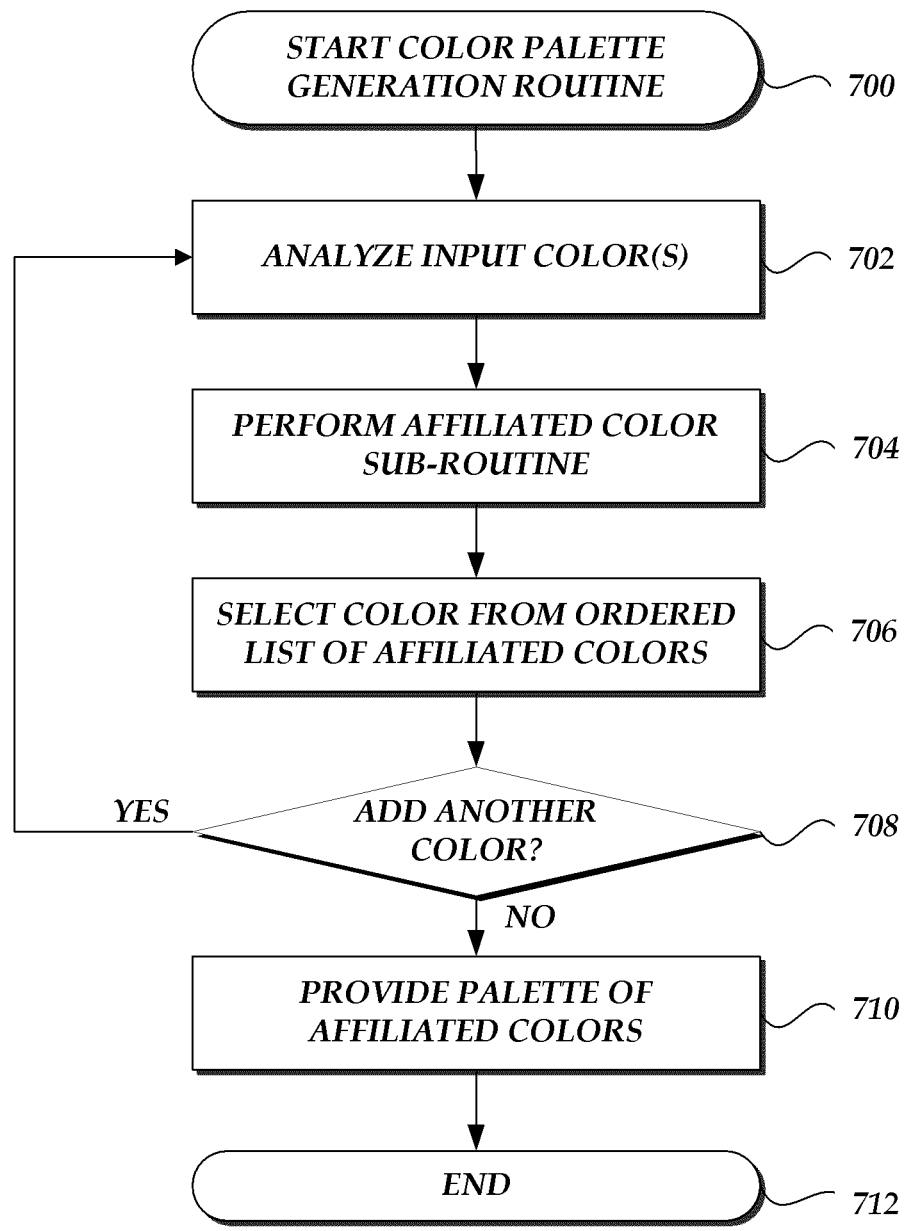
FIG. 7 is a flow diagram illustrating an embodiment of an affiliated color palette generation routine implemented by the affiliated color service.

FIG. 7 illustrates a flow diagram of an affiliated color palette generation routine implemented by an affiliated color service 105. The affiliated color service 105 begins the routine at block 700. At block 702, the affiliated color service 105 analyzes an input color or colors. The input color or colors can be received as described above with respect to block 502 of the routine, illustrated in FIG. 5. Analysis of the input color or colors can include the functions described herein with reference to block 502 in FIG. 5. Returning to FIG. 7, in some embodiments, the routine 700 can accept a plurality of input colors in determining a color palette, a particular example of which is described in U.S. patent application Ser. No. 14/316,292, entitled "BUILDING A PALETTE OF COLORS BASED ON HUMAN COLOR PREFERENCES," filed on Jun. 26, 2014, which is incorporated by reference herein in its entirety. In such a case, analyzing the input colors can include repeating, for each input color, the element of analyzing the input color as described with reference to block 502 in FIG. 5.

With reference to FIG. 7, at block 704, the affiliated color service 105 performs routine 500, described herein with reference to FIG. 5. In some embodiments, the affiliated color service 105 can move to block 504 upon entering the routine of FIG. 5 because the input color or colors has been analyzed in block 502. As described, the output of the routine of FIG. 5 is a weighted or ordered list of affiliated colors. The routine of FIG. 5 can be modified to provide the ordered list of affiliated colors where there is a plurality of input colors. For example, the affiliated color service 105 can identify palettes that include one or more of the plurality of affiliated colors. In some embodiments, the affiliated color service 105 identifies palettes that include all of the input colors. In some embodiments, the affiliated color service 105 identifies palettes that include at least one of the input colors. Once the palettes are identified, the weighting of the list of affiliated colors can proceed much the same way as described herein. In some embodiments, the weighting scheme of the affiliated colors is modified based on the input colors. For example, the popularity of each of the input colors can be used to normalize or scale the weighting factors of palettes of the respective input colors.

At block 706, the affiliated color service 105 selects a color from the ordered list of affiliated colors. The selection can be based on user input through a user interface. For example, routine 700 can be interactive such that a user provides the affiliated color service 105 with the input color(s) and is provided the ordered list of affiliated colors generated at block 704. The user can then select a color from the ordered list and indicate the selection to the affiliated color service 105. In some embodiments, the affiliated color service 105 selects a color from the ordered list of affiliated colors. The selection can be based at least in part on any one or more of the weighting of the affiliated color, the color distance of the affiliated color from the input color and/or other affiliated colors on the list, a selection criteria determined by a user or other system, or the like. Selection of the color from the ordered list of affiliated colors adds the color to the palette that includes the input color(s). In some embodiments, a plurality of colors can be selected.

In some embodiments, the affiliated color service 105 can select two or more colors from the ordered list of affiliated colors and provide a projection of what palettes would look like based on the selected colors. For example, the affiliated color service 105 can select the two most popular colors from the ordered list of affiliated colors (e.g., the two colors with the highest weight) and create a first tentative color palette that contains the input color(s) and the first popular color and a second tentative color palette with the input color(s) and the second popular color. The affiliated color service 105 can then provide a weighted or ordered list of affiliated colors for each of the two tentative color palettes. This can be accomplished, for example, through the routine described herein with reference to FIG. 5. This can advantageously be used to show a direction a color palette may go based on selection of a particular color for a color palette. In certain embodiments, the affiliated color service 105 can select the two or more colors based on user input, input from another system, random selection, or any combination of these.

In various embodiments, the affiliated color service 105 can recursively provide tentative color palettes to provide a variety of tentative color palettes. For example, for the two tentative color palettes described above, the affiliated color service 105 can select the two most popular colors from the ordered list of affiliated colors associated with each tentative color palette to generate a second level of tentative color palettes. This process can continue a number of times to provide the variety of tentative palettes. The affiliated color service 105 can select a different number of colors in each iteration of this routine and for each tentative palette. The affiliated color service 105 can select the two or more colors based on criteria that includes, for example and without limitation, color popularity, color variety, exclusion rules, color distance, or any combination of these.

At block 708, the affiliated color service 105 determines whether another color will be added to the palette. If another color is to be added, the affiliated color service 105 returns to block 702 to analyze the input colors, that now includes the color selected in block 706.

If the palette is finished (e.g., no other colors are to be added to the palette), routine 700 proceeds to block 710 where the affiliated color service 105 provides the palette of affiliated colors. As illustrated in FIG. 1, the provided palette of affiliated colors can be stored in palette data store 110, sent to the third party users 140, sent to the social networking service 150 and/or sent to the color palette providers 160. The affiliated color service 105 ends the routine at block 712.

Figure 8:
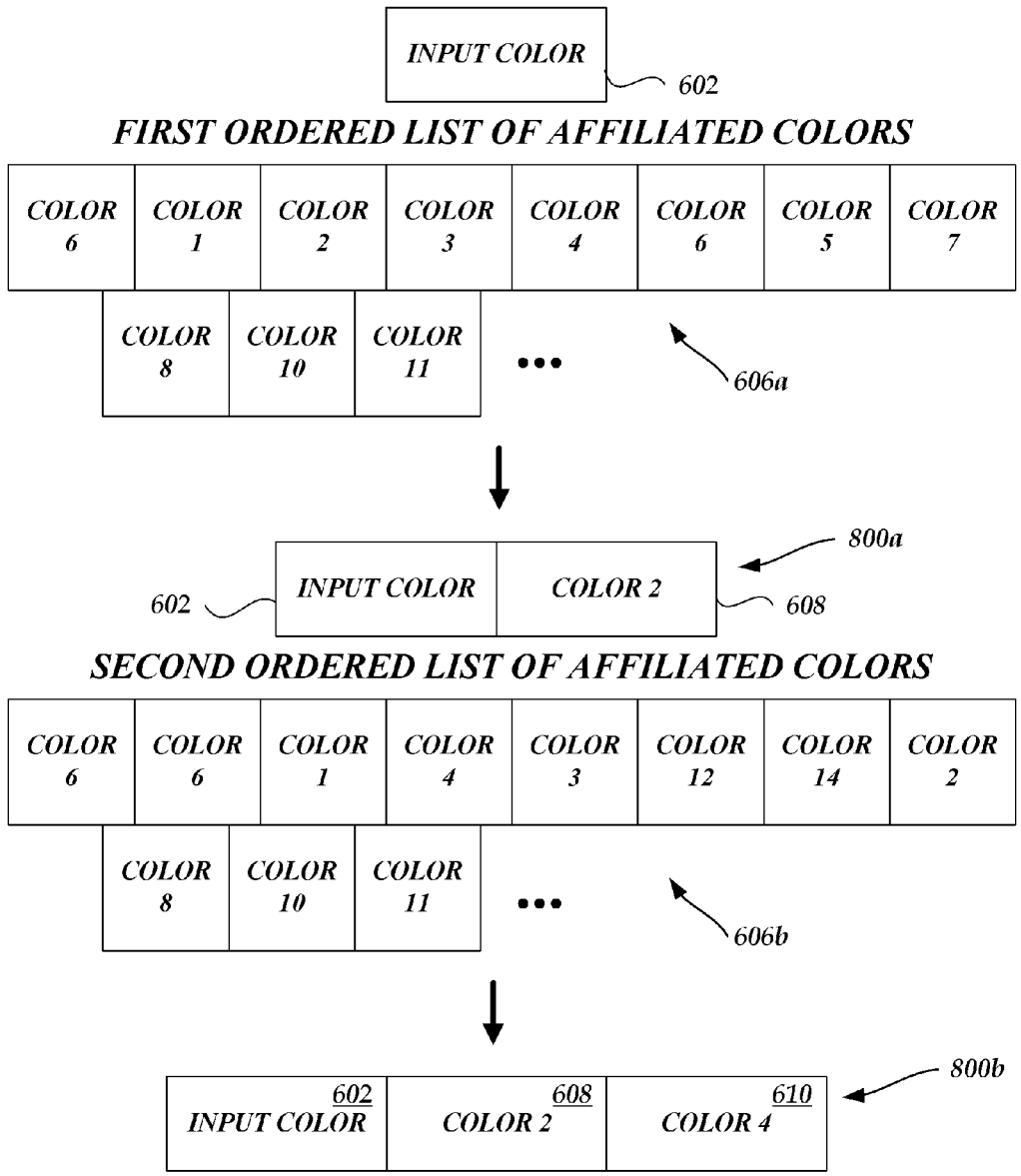
FIG. 8 illustrates example affiliated color palettes generated by the routine of FIG. 7.

FIG. 8 illustrates example affiliated color palettes 800a and 800b generated by the routine 700 of FIG. 7. Starting with an input color 602, a first ordered list of affiliated colors 606a is generated, as described with reference to FIG. 6. A color can be selected from the first ordered list of affiliated colors 606a. This results in a color palette 800a that includes the input color 602 and the selected color 608 (e.g., color 2 from the first ordered list of affiliated colors). The new color palette 800a can then be used to generate a second ordered list of affiliated colors that now includes colors associated with the input color 602 and the selected color 608. Because new and/or different palettes have been included in the routine to determine the ordered list of affiliated colors, the order of the affiliated colors may change. In addition, the second affiliated color list 606b may include colors not present in the first ordered list of affiliated colors 606a. This process can be repeated to build up a color palette with a plurality of colors, such as color palette 800b.

In some embodiments, as the number of input colors increases, the number of affiliated colors decreases. The affiliated color service 105, for example, may limit the identified palettes to those that include all of the input colors or a majority of the input colors. This may desirable to reduce the number of potential colors in the affiliated color list that may result in visually unappealing color combinations. In this way, the palette generation is self-limiting as the more colors in the palette the fewer affiliated colors that are presented.

By using the votes of a community of users, the generated color palettes represent a subjective color combination that may be different from what a mathematical formula may provide and that is generally preferable to users. Using human arbiters to generate color combinations can provide color palettes that mathematical algorithms may be incapable of fully determining.

The input color or colors can be determined or provided by a user, a computer system, or a combination of both. For example, a user may want to build an outfit that includes the color pink. Based on this input color, the affiliated color service 105 can provide an ordered list of affiliated colors that have been determined by a community of users to go well with the input color. As another example, a user can select the color pink as an input color and the affiliated color service 105 can be configured to select a one or more additional colors randomly or through another algorithm to provide a suggested color palette (or multiple color palettes). As another example, the user can pick an item (or a collection of items) and a color fingerprint (or a subset of it) can be used as the basis for determining affiliated colors. As yet another example, the user can pick a social networking profile picture (or a collection of pictures) and a color fingerprint (or a subset of it) can be used as the basis for determining affiliated colors. For an example of extracting a color fingerprint from an image of an item, see U.S. patent application Ser. No. 14/316,483, now U.S. Pat. No. 9,401,032, entitled "IMAGE-BASED COLOR PALETTE GENERATION," filed on Jun. 26, 2014, which is incorporated by reference herein in its entirety. Any of these color palettes could then be used to identify and/or filter potential items, other users, and/or other groups of users for the user.

For more example details on generating affiliated color palettes, see U.S. patent application Ser. No. 14/316,292, entitled "BUILDING A PALETTE OF COLORS BASED ON HUMAN COLOR PREFERENCES," filed on Jun. 26, 2014, and U.S. patent application Ser. No. 14/316,442, entitled "BUILDING A PALETTE OF COLORS FROM A PLURALITY OF COLORS BASED ON HUMAN COLOR PREFERENCES," filed on Jun. 26, 2014, each of which is incorporated by reference herein in its entirety.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain aspects of the embodiments described herein can be embodied within a form that does not provide all of the features and benefits set forth herein, as some features can be used or practiced separately from others. The scope of certain aspects disclosed herein is indicated by the appended claims rather than by the foregoing description. All changes that come within the meaning and range of equivalency of the claims are to be embraced within their scope.

What is claimed is:

1. A system comprising:
a data store configured to at least store computer-executable instructions; and
a hardware processor in communication with the data store, the hardware processor configured to execute the computer-executable instructions to at least:
access color preference information of a first user, the color preference information including at least a first image associated with the first user;
process the first image to generate a first affiliated color palette associated with the first image, wherein the first affiliated color palette is a color palette having a first color corresponding to a color in a color palette for the first image and one or more additional colors not in the color palette corresponding to the first image, the one or more additional colors identified based at least in part on:
the one or more additional colors being included in other color palettes having the first color; and
a respective rating for each of the other color palettes;
identify other users having a similar color preference as the first user based at least in part on the first affiliated color palette; and
generate a social networking recommendation for the first user with respect to at least one of the identified other users having a similar color preference with respect to the first user to facilitate interaction between the first user and the at least one of the identified other users having a similar color preference.

2. The system of claim 1, wherein the color palette corresponding to the first image is determined from metadata associated with the first image.

3. The system of claim 1, wherein the color palette corresponding to the first image is determined by identifying a plurality of representative colors and associated weights from a color distribution corresponding to the first image.

4. The system of claim 1, wherein the respective rating is a number of votes or the respective rating corresponds to a weight associated with a number of votes.

5. The system of claim 1, wherein the hardware processor is further configured to execute the computer-executable instructions to at least access item purchase information associated with the first user, the item purchase information including color palette information regarding a purchased item, wherein the identification of the other users having a similar color preference as the first user is based at least in part on the item purchase information including the color palette information.

6. The system of claim 1, wherein the hardware processor is further configured to execute the computer-executable instructions to at least:
identify a first plurality of affiliated color palettes associated with the first user; and
rank the first plurality of affiliated color palettes to correspond to a determined color palette preference of the first user;
wherein identifying other users having a similar color preference as the first user is based at least in part on the ranking of the first plurality of affiliated color palettes.

7. A computer-implemented method comprising:
under control of a hardware computing device configured with specific computer-executable instructions,
determining a color preference of a first user, the color preference corresponding to at least a first image associated with the first user;
processing the first image to generate a first affiliated color palette associated with the first image, wherein the first affiliated color palette is a color palette having a first color within a color range of a color in a color palette for the first image and an additional color outside a color range of any individual color identified in the color palette for the first image;
identifying other users having a similar color preference as the first user based at least in part on the first affiliated color palette; and
facilitating interactions between the first user and one or more of the identified other users having a similar color preference with respect to the first user.

8. The computer-implemented method of claim 7, wherein the color palette for the first image is determined from the first image by selecting a palette color from a plurality of representative colors identified from the first image.

9. The computer-implemented method of claim 8, wherein the plurality of representative colors are identified by selecting a subset of colors from a set of colors depicted by the first image based, at least in part, on a color distance associated with the subset of colors.

10. The computer-implemented method of claim 9, wherein the plurality of representative colors are further identified by merging individual colors of the selected subset of colors with similar colors in the set of colors depicted by the first image, respectively.

11. The computer-implemented method of claim 8, wherein individual representative colors of the plurality of representative colors are identified by determining a dominance of the individual representative color among a plurality of colors depicted by the first image.

12. The computer-implemented method of claim 7, wherein the first image is associated with an item purchased by the first user.

13. The computer-implemented method of claim 7, wherein facilitating interactions between the first user and the one or more of the identified other users comprises providing the first user with a social networking recommendation with respect to the one or more of the other identified users having a similar color preference with respect to the first user.

14. The computer-implemented method of claim 7, wherein facilitating interactions between the first user and the one or more of the identified other users having a similar color preference further comprises providing an indication to the one or more of the identified other users when the first user has purchased a first item associated with the first affiliated color palette.

15. The computer-implemented method of claim 7, wherein facilitating interactions between the first user and one or more of the identified other users having a similar color preference further comprises enabling the first user to share a color palette with at least one identified other user.

16. The computer-implemented method of claim 7, wherein identifying other users having a similar color preference as the first user is based at least in part on color-related search queries submitted by one or more other users.

17. The computer-implemented method of claim 7 further comprising:
  identifying a first plurality of affiliated color palettes associated with the first user; and
  ranking the first plurality of affiliated color palettes to correspond to a determined color palette preference of the first user;
  wherein identifying the other users having a similar color preference as the first user is based at least in part on the ranking of the first plurality of affiliated color palettes.

18. A non-transitory computer-readable storage medium storing computer-executable instructions that when executed by a processor perform operations comprising:
  determining a color preference of a first user, the color preference corresponding to at least a first image associated with the first user;
  processing the first image to generate a first affiliated color palette associated with the first image, wherein the first affiliated color palette is a color palette having a first color within a color range of a color in a color palette for the first image and an additional color outside a color range of any individual color identified in the color palette corresponding to the first image;
  identifying other users having a similar color preference as the first user based at least in part on the first affiliated color palette; and
  facilitating interactions between the first user and one or more of the identified other users having a similar color preference with respect to the first user.

19. The non-transitory computer-readable storage medium of claim 18, wherein the first image is associated with an item purchased by the first user.

20. The non-transitory computer-readable storage medium of claim 18, wherein facilitating interactions between the first user and one or more of the identified other users comprises providing the first user with a social networking recommendation with respect to the one or more of the identified other users having a similar color preference with respect to the first user.

21. The non-transitory computer-readable storage medium of claim 18, the operations further comprising:
  identifying a first plurality of affiliated color palettes associated with the first user; and
  ranking the first plurality of affiliated color palettes to correspond to a determined color palette preference of the first user;
  wherein identifying other users having a similar color preference as the first user is based at least in part on the ranking of the first plurality of affiliated color palettes.

* * * * *